US012756548B1

(12) United States Patent
Lee

(10) Patent No.: US 12,756,548 B1
(45) Date of Patent: Oct. 6, 2026

(54) DI-ENCRYPTED INTERCOMMUNICATION WITH CRYPTOGRAPHY PROTECTION

(71) Applicant: DI Cybersecurity Corporation, Bloomfield Hills, MI (US)

(72) Inventor: Howard Hong-Dough Lee, Bloomfield Hills, MI (US)

(73) Assignee: DI Cybersecurity Corporation, Bloomfield Hills, MI (US)

( * ) Notice: Subject to any disclaimer, the term of this patent is extended or adjusted under 35 U.S.C. 154(b) by 82 days.

(21) Appl. No.: 19/308,234

(22) Filed: Aug. 23, 2025

Related U.S. Application Data

(63) Continuation of application No. 18/956,015, filed on Nov. 22, 2024, now Pat. No. 12,641,084, which is a continuation of application No. 18/368,006, filed on Sep. 13, 2023, now Pat. No. 12,341,778.

(51) Int. Cl.
*H04L 29/06* (2006.01)
*H04L 9/08* (2006.01)
*H04L 9/32* (2006.01)

(52) U.S. Cl.
CPC .......... *H04L 9/0866* (2013.01); *H04L 9/3226* (2013.01)

(58) Field of Classification Search
CPC . H04L 9/0866; H04L 9/3226; H04L 63/0876; H04L 63/10; G06F 21/44; G06F 21/445
See application file for complete search history.

(56) References Cited

U.S. PATENT DOCUMENTS 7,058,613 B1 6/2006 Sato et al.
7,113,577 B2 9/2006 Cook et al.
8,204,833 B2 6/2012 Mu et al.
8,413,898 B2 4/2013 Heffez
8,590,007 B2 11/2013 Heffez
9,060,057 B1 6/2015 Danis
10,674,009 B1 6/2020 Jakobbson
10,757,116 B2 8/2020 Ardeli et al.
10,938,811 B2 3/2021 Dwarkaprasad et al.
11,146,676 B2 10/2021 Sena, Jr. et al.
11,218,324 B2 1/2022 Wentz et al.
11,337,076 B2 5/2022 Kudtarkar et al.
2014/0281561 A1* 9/2014 Etchegoyen ............ G06F 21/73 713/182
2020/0004936 A1 1/2020 Avital
2020/0125729 A1 4/2020 Priel
2020/0285719 A1 9/2020 Posillico et al.
2021/0409399 A1* 12/2021 Chifor ..................... H04L 67/30
2022/0060498 A1 2/2022 Head, Jr. et al.
2022/0086147 A1* 3/2022 Chen ........................ H04K 1/00
2022/0150245 A1* 5/2022 August ................... H04L 67/54
2022/0377071 A1* 11/2022 Rosas Bustos ....... H04W 12/63
2023/0155829 A1 5/2023 Pabijanskas et al.
2023/0156023 A1 5/2023 Albero et al.
2023/0281687 A1 9/2023 Bhardwaj et al.

* cited by examiner

*Primary Examiner* — Malcolm Cribbs

(57) ABSTRACT

A method/algorithm or chip/module for establishing DI-encrypted intercommunication, comprising (i) generating IDs for use as a fingerprint of a first device/system; (ii) presenting the fingerprint as a unique authentication of the first device/system to a second device/system to be intercommunicated with; and (iii) requesting the second device/system to utilize the fingerprint as a device-dependent encryption key for creating encrypted data to be transmitted to the first device/system, so as to provide cybersecurity and cryptography protections to the DI-encrypted intercommunication.

18 Claims, 8 Drawing Sheets

600

DI-ENCRYPTED INTERCOMMUNICATION WITH CRYPTOGRAPHY PROTECTION

Claim the priority of pending U.S. application Ser. No. 18/956,015, a continuation patent application based on U.S. Pat. No. 12,341,778 (U.S. application Ser. No. 18/368,006) filed on Sep. 13, 2023. Also, related is Applicant's allowed U.S. application Ser. No. 18/790,993, a continuation-in-part patent application based on U.S. Pat. No. 12,346,436 filed on Sep. 13, 2023.

FIELD OF THE INVENTION

Presented is DI-encrypted intercommunication for providing cybersecurity and cryptography protections. More particularly is to generate DI (device identification) information of a digital device representing a unique fingerprint or biometrics for use as a device-dependent cryptography key.

BACKGROUND OF THE INVENTION

One of the most facilitating factors attributed to the skyrocketing cyberattacks and the devastating financial losses in billions of dollars lies in the fact that cybercriminals conducting cyberattacking essentially without being exposed to any risk of punitive damages.

U.S. Pat. No. 8,204,833 provided a technique to generate fingerprint based on the information collected through the actions a user conducts on the Internet. '833 treated a device and account information as one whole set of entry for authentication instead of relying on the individual's representation.

U.S. Pat. No. 8,413,898 teaches assigning a geographical location to an Internet user by using a web site to identify a computer signature of a wireless communication device for providing search results associated with the saved geographical location back to the wireless communication device. U.S. Pat. App. No. 2013/0125220 teaches identifying, by means of the website, a computer signature of an Internet user. However, under the current practice, the computer signature available for Heffez's teaching is limited to the identifiers contained in the existed data packet, which is by far not unique.

In contrast to the prior art requiring user to respond with a pin code for network access, the present invention aims to achieve cybersecurity as well as cryptography protections by employing a unique fingerprint as device-dependent encryption key. In accordance with the present invention, for the first time, no cybercriminal can hack into the device-dependent encrypted intercommunication.

SUMMARY OF THE INVENTION

A first primary preferred embodiment is to provide a cybersecurity Internet system comprising: (a) communication means; (b) memory means storing a banned DI list of the communication devices to be banned from giving Internet or online access; (c) a control system for controlling operation of the communication means and the memory means; and (d) operating instructions stored in the memory means for (i) allowing the communication means to start a first communication in response to an incoming signal issued from a communication device, for obtaining the DI information of the communication device; (ii) elevating the communication device to a second communication granting online access to a webpage, only if the DI information is received and not comprised in the banned DI list; (iii) imposing a punitive measure by revoking the online access previously granted to the communication device, if detecting the online access involved in an unwanted activity on the webpage; and (iv) adding the communication device involved in the unwanted activity to the banned DI list to achieve the punitive measure.

A second primary preferred embodiment is to provide a punitive cybersecurity protection method on secured Internet data, comprising: (a) setting DI information required to be obtained for any remote device requesting online access, wherein the DI information comprises at least one ID selected from a group consisting of the IDs of the hardware components and/or software of the remote device; (b) building a banned DI list for remote devices to be banned from giving online access to the secured data; (c) in response to an incoming signal of a device, obtaining the DI information of the device; and (d) granting access to the secured data, only if the DI information is obtained and not comprised in the banned DI list.

A third primary preferred embodiment is to provide a punitive cybersecurity operating method on non-secured Internet data. The method comprises (a) building a banned DI list for devices to be banned from giving online access as a punitive measure; (b) in response to an incoming signal issued from a device, obtaining the DI information of the device; (c) granting online access on a webpage, only if the DI information is received and not comprised in the banned DI list; (d) banning the online access, if detecting the device involved in an unwanted activity on the webpage; and (e) adding the communication device involved in the unwanted activity to the banned DI list so as to update the punitive measure.

A fourth primary preferred embodiment is to provide a DI-Member-Only cybersecurity operating method, comprising (a) building an allowed DI list for the devices predefined or preselected to be allowed for accessing a DI-Member-Only network; (b) in response to an incoming signal issued from a device, obtaining its DI information; (c) granting access to the DI-Member-Only network, only if the DI information is received and comprised in the allowed DI list; and (d) updating the allowed DI list if needed.

A fifth primary preferred embodiment is to provide a cybersecurity protection method for a smartphone aiming to deal with scam phone calls and/or phishing messages. The method comprises: (a) building an allowed list to be allowed, a disallowed list to be disallowed, a repeated list to be proceeded contingently in conjunction with the disallowed list, and/or a banned list to be banned always, wherein the allowed list comprises at least the contacts of the smartphone, and wherein the repeated list refers to the incoming signals repeatedly requesting for establishing communication; (b) providing a first stage of communication in mute mode or a "time-independent Do Not Disturb" mode during the normal operation for the steps of (i) obtaining ID information from incoming signals, wherein the ID refers to identification selected from a group consisting of at least one phone number, at least one sender identity, at least one email address, at least one social network media account, at least one DI, at least one social network media account, and any of their combinations; (ii) comparing the ID information with the allowed list, the disallowed list, the banned list, and the repeated list; (iii) declining a communication request, if the ID information has a match with the banned list, and/or with the disallowed list, but not with the repeated list; and (iv) allowing to leave a message, if the ID information is not comprised in any of the allowed list, the disallowed list and the repeated list; wherein the message is selected from a group consisting of a voicemail, a text message, a multimedia message, a video message, and any of their combinations; and (c) elevating the smartphone to a second stage of communication in active mode signifying an audio/visual/vibration notification to which prompt attention should be given, when the ID information has a match (i) with the allowed list, and/or (ii) with the repeated list but not with the disallowed list.

A sixth primary preferred embodiment is a DI operating system for establishing DI communication, comprising: (a) building a DI database on an Internet system for controlling if an online access request from a device should be granted, wherein the DI database comprises the DI information of devices to be controlled; (b) setting specified DI information to be received from a device issuing the online access request; (c) formatting the specified DI information into at least one DI packet; and (d) transmitting the at least one DI packet from the device to the Internet system for verification.

A seventh/eighth primary preferred embodiment recites a DI module/chip for enabling trusted inbound/outbound communications, comprising: (a) input/output means for establishing circuit connection with hardware components; (b) DI interfacing means in circuit connection with the input/output means, for obtaining IDs of the hardware components and software; and (c) control means comprising a coprocessor and instructions for (i) setting the content of the IDs to be comprised for forming DI information; and (ii) formatting the DI information in a form suitable for transmitting to provide the trusted DI communications to a remote device; (d) persistent memory circuitry for storing the DI information as the device fingerprint for enabling the trusted inbound and outbound communications; and (e) a cryptoprocessor for encoding, enciphering, and/or hashing the DI information.

A ninth primary preferred embodiment recites a method/algorithm or chip/module for establishing DI-encrypted intercommunication, comprising (i) generating IDs for use as a fingerprint of a first device/system; (ii) presenting the fingerprint as a unique authentication to a second device/system to be intercommunicated; and (iii) requesting the second device/system to utilize the fingerprint as a device-dependent encryption key for creating encrypted data to be transmitted to the first device/system, so as to provide cybersecurity and cryptography protections to the DI-encrypted intercommunication.

DETAILED DESCRIPTION OF THE PREFERRED EMBODIMENTS

Punitive Cybersecurity Protection for Internet and Personal Communication Devices A first primary preferred embodiment is embodied in a cybersecurity communication device, apparatus, equipment, or system rendered capable of imposing a punitive measure to cybercriminals. The punitive measure is aiming to render the communication devices once identified getting involved in a cyberattack incapable of accessing the Internet or online network. The punitive cybersecurity protection may be implemented both to (i) personal communication devices such as computers, mini PCs, laptops, notebooks, tablets, and smartphones capable of accessing online or Internet data for personal usage; and (ii) Internet systems such as Internet service providers, web hosts, severs, search engines, data centers, social network media systems, cloud storage, and others for Internet servicing usage in a global scale.

Figure 1:
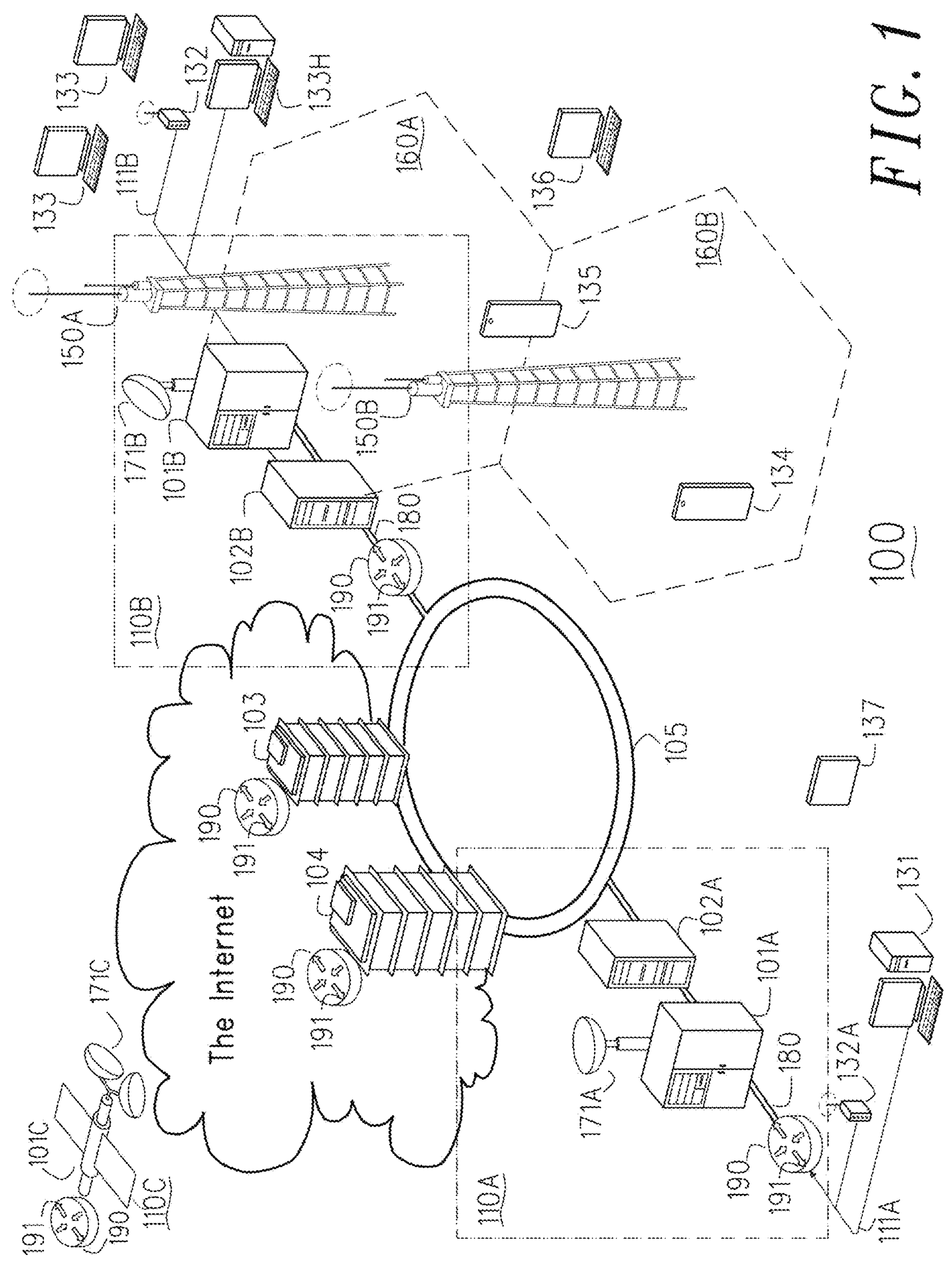
FIG. 1 depicts punitive cybersecurity communication devices and systems in various layouts in accordance with a first primary preferred embodiment.

Depicted in FIG. 1 is a "punitive cybersecurity system" PCS hereinafter, aiming to provide a new Internet system or network server or to implement the NSP and/or ISPs with cybersecurity protection means 190 or Internet communication systems 110A, 110B and 110C (punitive satellite communication system including earth stations 171A, 171B, and satellite/GPS 171C) and wireless systems (with cell towers or base transceiver stations 150A and 150B). Internet communication systems 110A, 110B and 110C each basically comprises one of Internet communication units 101A, 101B and 101C multitaskingly connected to ISP backbone 105 at separate locations and to memory-storage means 102A and 102B that may also function as servers, mainframes or cloud computers/storage for hosting websites each containing a plurality of webpages and for storing data or for providing cloud computing. ISP backbone 105 has connectivity multitaskingly with Internet backbone carrier sites often at NSP/MAE/NAP 103 and deep-sea data center/cloud storage 104. Mostly important is that punitive Internet communication systems each comprises cybersecurity protection means 190.

In brief, depicted in FIG. 1 are seven layouts for providing the punitive cybersecurity protection from a global scale descending to a personal scale, comprising (i) PCS 100 as a global integrated system, (ii) each of NSP/MAE/NAP 103 and deep-sea data centers/cloud storage 104, (iii) each of punitive Internet communication systems 110A, 110B and punitive satellite communication system 110C, (iv) each of Internet communication unit 101A, 101B or 101C, (v) each of cybersecurity protection means 190, (vi) small private server 131 connected with LAN 111A, and (vii) each of smartphones 134 and 135, computers 136 (connected with cellular data), autonomous cars or unmanned aerial vehicles (UAVs) 140, and drones or unmanned aircraft system (UAS) 145, which is generally recited as a personal communication device.

Layouts (i) to (vi) are exemplary applications offering the punitive cybersecurity protection to protect "Internet data" resided on memory-storage means 102A and 102B functioning as servers, mainframes or cloud computers/storage, NSP/MAE/NAP 103 and deep-sea data centers/cloud storage 104, and private server 131, which will be accessed by various personal communication devices. Layout (vii) is to provide the punitive cybersecurity protection to protect "personal data" resided on personal communication devices such as computer 131, 133, 133H or 136, tablet 137, smartphone or cellphone 134 and 135, computers 136, autonomous cars or UAVs 140, and drones or UAS 145 for personal usage.

Without the present invention, cybercriminals may operate as a group collaboratively through a Wi-Fi device or router 132 by deploying several units of computer 133 or may independently utilize a single computer 133H (for instance) alone through a home LAN 111B, which connects to a tier 3 ISP having access to the network infrastructure of NSP/MAE/NAP 103 or deep-sea data center/cloud storage 104 via a PoP, which establishes peer to peer connections globally via IXPs (Internet exchange points) having common grounds of IP networking, allowing participated ISPs to exchange data therewithin. Similarly, portable communication devices such as smartphone/cellphone or car phone 134 moved from cell region 160A to cell region 160B may be used as a hacking or scamming tool along with a Bluetooth keyboard and mouse (not shown). Without the punitive cybersecurity systems such as 110A, 110B and 110C or cybersecurity protection means 190, the conventional ISPs, private server 131, website host providers, NSP/MAE/NAP 103 and deep-sea data center/cloud storage 104 may also be potentially subjected to continuous cyberattacks from cybercriminals free of any charge.

Cybersecurity protection means 190 is rendered to collect the device identification hereinafter defined as "DI" information, which stores a banned DI list for the communication devices to be banned from giving online access, and further to execute the process of banning in accordance with the banned DI list. Cybersecurity protection means 190 each in a separated unit, functioning as if an isolated security guard or a security gate in front of a corporate building entrance. Isolation or separation of cybersecurity protection means 190 from Internet communication unit 101A, 101B or 101C and NSP/MAE/NAP 103 or deep-sea data center/cloud storage 104 offers a special hardware level of cybersecurity protection to the Internet data. Without the isolation, malicious ransomware, malware, Trojan horse or viruses are able to travel and spread throughout entire memory storage drives, NVMe modules, solid state drives and/or hard drive disks connected with internal buses.

DI information may generally include Internet IP (Internet protocol) address, MAC (media access control) address that is a unique identifier assigned to a network interface controller (NIC) for use as a network address in communications such as a cellphone, Ethernet, Wi-Fi, NearLink, Bluetooth, NFC, and UWB assigned by device manufacturers, which are the burned-in, hardware address through read-only memory or a firmware mechanism. Also, the DI information will include domain name address and/or URL (Uniform Resource Locators) address information in order to protect personal communication device and data to be further illustrated under the section entitled "Punitive Cybersecurity Protection on Personal Communication Devices" and will be extended to include other hardware and software to be further discussed under the section entitled "Cybersecurity Operating System for Enabling DI Communication" hereinafter in conjunction with FIG. 6.

A packet in IPv4 or IPv6 is a string of bits, which may be a small segment of a larger message, comprising network interface identification, location addressing, and actual data. Each packet has a header string and a data string. The sizes of the header string (without data) may be 20 bytes long minimally for IPv4 (using 32 bits), or 40 bytes for IPv6 (using 128 bits). The present invention may employ other lengths of bytes for including the DI information recited hereinabove and to be further elaborated under the section entitled "Cybersecurity Operating System for Enabling DI Communication." The information contained in the header string includes the Internet IP addresses of a source device (such as Wi-Fi device or router 132 and NearLink 132A, computer 131, 133, 133H, 136, tablet 137, smartphone or cellphone 134 and 135, autonomous cars or UAVs 140, and drones or UAS 145) and the destination (such as a website hosted on server 131 or the websites resided on NSP/MAE/NAP 103 and deep-sea data center/cloud storage 104), plus other fields for helping in routing the packet properly.

Referring again to FIG. 1, when received through communication connecting means 180, the punitive cybersecurity system requires at least one of the packets issued from a remote or personal communication device (such as Wi-Fi device or router 132 and NearLink 132A, computer 131, 133, 133H, 136, tablet 137, smartphone or cellphone 134 and 135) to be the DI packet containing DI information before any communication can be established.

Punitive Cybersecurity Protection on Internet Communication Devices

Hereinafter recited are the Internet communication devices assigned to the layouts (i) to (vi). Situated in each unit of cybersecurity protection means 190 are communication means 191, memory means, operating instructions and a control system. The memory means stores a banned DI list of the remote personal communication devices to be banned from giving online access. The control system comprising at least one microprocessor in communication with the memory means is provided for executing the operating instructions and for controlling operation of communication means 191. Also stored in the memory means and available to the control system are the operating instructions for (i) allowing communication means 191 to start a first stage of communication in response to an incoming signal issued from a remote personal communication device requesting online access; (ii) elevating the remote personal communication device to a second stage of communication allowing online interacting on a webpage, if determining a DI packet from the incoming signal is received and not comprised in the banned DI list, wherein the DI packet comprises the DI information of the remote personal communication device; (iii) imposing the punitive measure by disallowing the remote personal communication device to continue the online interacting, if detecting the online interacting involves an unwanted activity on the webpage; and (iv) updating the banned DI list with the DI information of the remote personal communication device identified to get involved in the unwanted activity.

The unwanted activity generally refers to any cyberattack or any activity being unauthorized, fraudulent, malicious, hacking, phishing or scamming, and/or employing adware, viruses, worms, ransomware, bots, Trojan horses, keyloggers, rootkits, spyware or cryptomining malware, and/or uploading/sending cyberattack files to the Internet as baits. These viruses and malware may be present in certain file types and extensions identifiable by some antivirus software programs such as Microsoft Defender, McAfee, Norton, and others.

Communication means 191 comprises communication circuitry connected to the Internet through wireless data transmitting (via cell tower 160A or 160B for instance) or wired data transmitting (such as communication connecting means 180). The communication circuitry is rendered operable to start the first stage of communication multitaskingly for processing a plurality of DI packets issued from a plurality of remote personal communication devices and to selectively elevate the communication to a second stage for allowing online access.

In brief, cybersecurity protection means 190 is recited as an isolated security guard or a security gate that will preclude cybercriminals from obtaining any opportunity to attack the Internet data.

For an illustration purpose, cybersecurity protection means 190 in communication with memory-storage means 102A may be adapted to function as a central cybersecurity system, wherein its central banned DI list will be updated and synced preferably in realtime with other cybersecurity protection means 190 each having its own banned DI list as a result of encountering various cyberattack activities. When updated and synced in a global scale, the central banned DI list will impose the punitive measure to ban, disallow, prohibit, or forbid any of the cybercriminals' devices from accessing any webpage, including any popular search engine such as Google, Yahoo, Bing, and others, financial institutions, banks, stocks, future and cryptocurrency trading platforms, webmails, cellphone messages and digital phone calls, downloads of apps from Google play and Apple stores, as a buyer or seller on Amazon and other E-commerce stores, government and other high-security websites.

Punitive Cybersecurity Protection on Personal Communication Devices

Now recited is the punitive cybersecurity protection on the layout (vii) referring to the personal communication devices such as computer 133, 133H, 136, tablet 137, smartphone or cellphone 134 and 135, in which each of them will be internally installed with an app.

Contrary to attacking the Internet data or the online network by a personal computer, a cybercriminal may also utilize computer 133H as a server to host a website with luring contents aiming to ensnare personal communication devices as targeted victims for unlawful profits. A cybercriminal often repackages ransomware or malicious viruses pretending to be a well-known software program uploaded to BitTorrent network or torrent webpage waiting for a victim to take the bait. Alternatively, smartphone 134 may be utilized as a cyberattack tool for sending out the baits through bulk scam emails, text messages, or digital voice calls. Cybercriminals may further post luring ads with popup links.

The cybersecurity protection is applicable to wireless communication devices such as smartphone 135, which stores a banned DI list of the Internet webpages or websites hosted by cybercriminal Internet servers. A cybercriminal may (i) host webpages or websites on a phishing server, (ii) send emails or text messages, short message service (SMS), multimedia messaging service (MMS), or video messaging in bulk each typically containing a link or attachment that has a fake login page of any appear-to-be trusted website such as a bank, antivirus subscription, online merchant, shipping company, and (iii) scam phone calls (to be further elaborated in a fifth primary preferred embodiment).

The control system of the personal communication device is rendered to achieve cybersecurity protection by installing the operating instructions of the present embodiment for controlling operation of communication circuitry and memory means.

Specifically stored in the memory means and available to the control system are the operating instructions for (i) allowing the communication circuitry to establish a first stage of communication in response to an incoming signal issued from a remote Internet communication device, wherein the first stage of communication is to detect incoming signals and to determine if the incoming signal has a DI packet; (ii) elevating the incoming signal of the remote Internet communication device to a second stage of communication for allowing to receive a phone/video/text message/file, only if the DI packet is received and determined not to comprise the DI information contained in the banned DI list; (iii) allowing the personal communication device to submit the DI information to a remote central cybersecurity system having a central banned DI list, if the received phone/video/text/file is determined to get involved in committing a cyberattack, phishing or scam activity; and (iv) updating or syncing the banned DI list with the remote central cybersecurity system and then with the other personal communication devices participated in the cybersecurity protection, so as to impose the punitive measure sweepingly.

The remote central banned DI list may be resided on a third party sever system, in addition to the Internet communication devices such as punitive Internet communication systems 110A, 110B and 110C or cybersecurity protection means 190, the conventional ISPs, private server 131, website host providers, cloud computers, NSP/MAE/NAP 103 and deep-sea data center/cloud storage 104.

Punitive Cybersecurity Operating Method on Secured Internet Data

Figure 2:
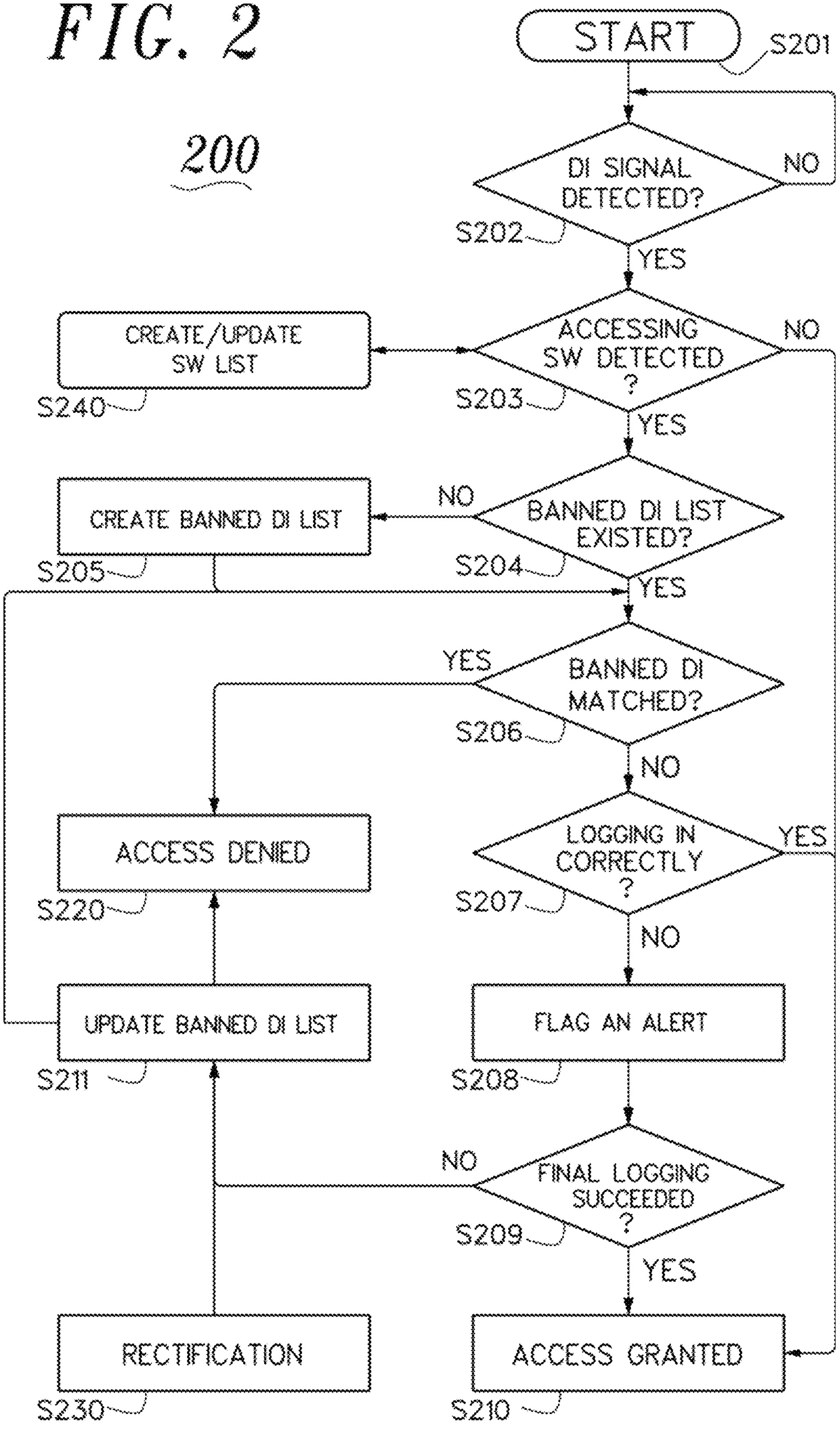
FIG. 2 is a flowchart reciting a cybersecurity operating method for punitively protecting secured Internet data in accordance with a second primary preferred embodiment.

Cybersecurity protection means 190 is further elaborated in FIG. 2 as a second primary preferred embodiment reciting a punitive cybersecurity operating method 200 to be implemented to Internet systems, or to personal communication devices.

Punitive cybersecurity operating method 200 in a flowchart comprises steps, instructions, or processes. The term "cybersecurity system" hereinafter generally refers to cybersecurity protection means 190, Internet communication unit 101A, 101B or 101C and the layouts (i) to (vii) implemented with punitive cybersecurity operating method, which will be multitaskingly executed on the main RAM circuitry of cybersecurity system referred in FIG. 1. Note that "S" stands for "Step" hereinafter.

Method 200 starts with Step S201, in which the cybersecurity system always provides a first stage of communication to an incoming signal containing bits in a form of packet issued from a remote personal communication device. Regardless of being in IPv4, IPv6 or newer protocol, at least one packet will contain DI information. The conventional browsers relying on encryption such as HTTPS (Hypertext Transfer Protocol Secure) are unable to offer the punitive measure. To implement the punitive measure, S202 is adapted to keep querying the remote personal communication device to respond with at least one DI packet, if an initially received packet is not a DI packet. Alternatively, a new web browser or protocol may be evolved into automatically formatting at least one packet into the DI packet, when a personal communication device launches a browsing request. In short, S202 will detect or determine if a DI packet is present in an incoming signal submitted from a personal communication device.

S203 detects if the incoming DI signal involves in accessing secured webpage, shown as "SW" in FIG. 2 and hereinafter. The SW detection may be occurred at the time when the webpage is visited. S240 creates/updates/provides a SW list of the Internet webpages and websites having SW nature. The SW list is preferably a table or registry of the Internet IP addresses or URL address information of the SW webpages stored on cybersecurity protection means 190 (isolated from the SW data), thus stopping a cyberattack at the very earliest stage even before giving any accessing opportunity to the SW webpages.

When the SW accessing is detected, S204 further checks if a banned DI list exists. The banned DI list contains a tabulation or registry of the communication devices previously denied to the SW accessing. By searching the banned DI list, S206 can easily determine if the incoming signal contains DI information having a match to the entries on the banned DI list. If the DI information doesn't have a match with the banned DI list, the incoming signal will be elevated to a second stage of communication that is to grant access to the SW website or webpage for proceeding with a login process, S207. If correctly logging in, a user will be further granted with an access permission to other SW webpages of the website, S210. If not, S208 flags an alert to further monitor the user's subsequent login activities. The number of allowable failed login attempts may be set by the SW websites or by a preset value at S208. Access is granted if the final login step at S209 determines to be successful. If not, S211 will add the DI information of the incoming signal to the banned DI list, performing an update. Followed is a denied access S220. The banned DI list upon update will feed back for use at S206, thus applying the banned DI list to other SW websites.

Preferably, the update includes to sync the banned DI list with a central banned DI list situated on a central punitive cybersecurity system. As a result, the banned DI list will impose the punitive measure by banning an identified communication device to access any SW webpage on the Internet sweepingly.

Should there exist a mistake from a user login activity, S230 provides a rectification step to remove the entry of a mistakenly denied DI information set from the banned DI list at S211. The rectification step S230 shall be initiated from the mistaken user by manually contacting (mostly via a phone call) an associated website authority to undergo an inhouse verification process. The rectification process S230 doesn't create any extra effort to the mistaken user, as it is conventionally necessary to call a credit card customer service representative authorized to issue a rectification request from S230 to S211. Alternately, a digital rectification process may be employed by linking the mistaken user's known identification information (such as an email address/account or cell phone digitally reachable and other credential questions and answers) on file for proceeding with a verification confirmation.

Punitive Cybersecurity Operating Method on Public Internet Data

Figure 3:
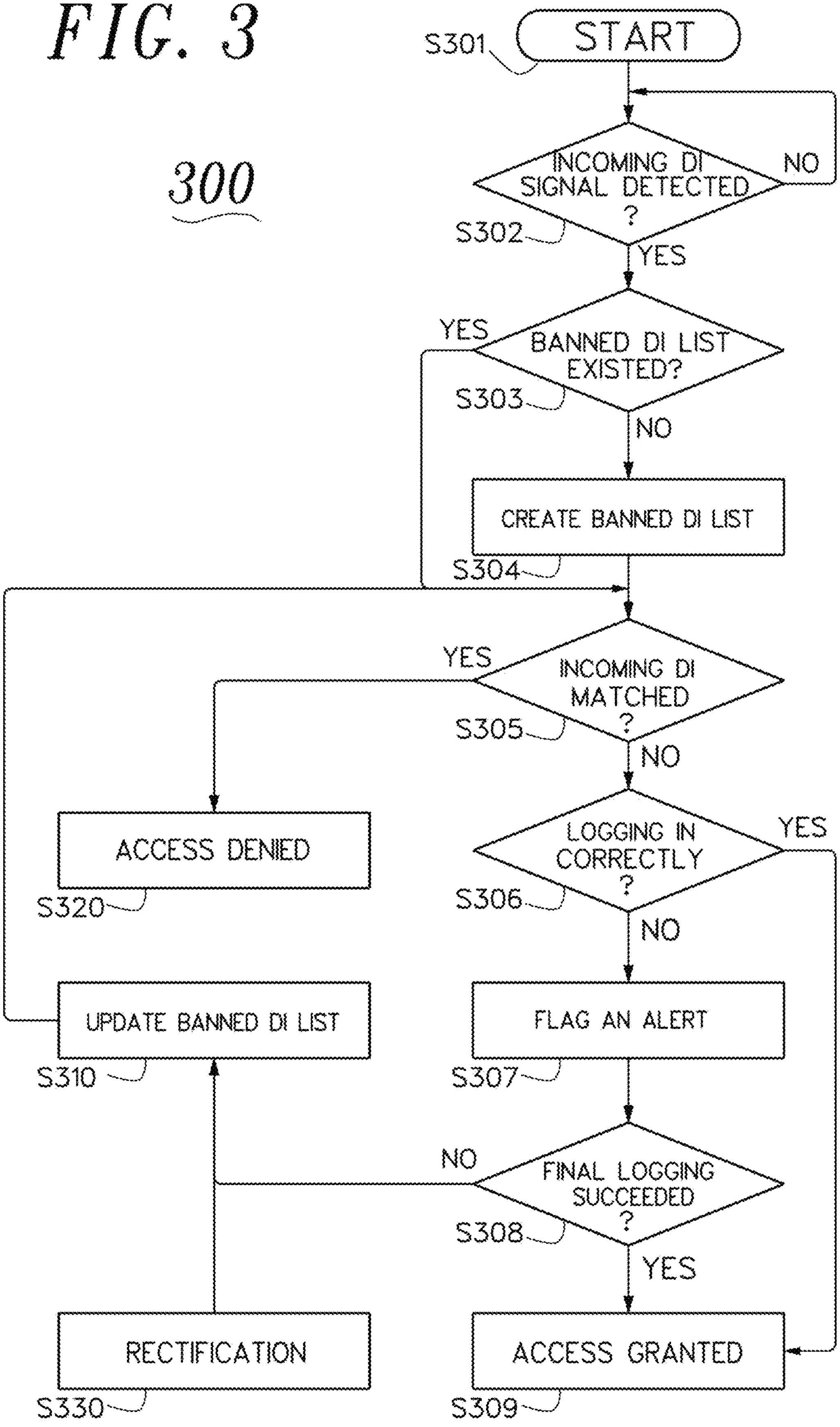
FIG. 3 is a flowchart reciting a cybersecurity operating method for punitively protecting global Internet data in accordance with a third primary preferred embodiment.

Elaborated in FIG. 3 is a cybersecurity operating method 300, in which a cybercriminal's communication device will be banned from accessing the Internet system or the layouts (i) to (vi) implemented with the present embodiment, even on non-secured websites or webpages. Starting with the step S301, method 300 provides a first stage of communication to an incoming signal issued from a remote personal communication device requesting access the Internet system, for obtaining the DI information. S302 is to determine if the incoming signal contains a DI packet. If not, it will keep querying for a DI packet from the remote personal communication device. During the initial implementation of the present embodiment, a banned DI list will be created by activating S303 and S304. The banned DI list may be obtained by downloading a copy from a remote central cybersecurity system. Another exemplary building/creating DI list process will be given under the section entitled "Cybersecurity Operating System for Enabling DI Communication" later. Any incoming DI packet will be checked to see if its DI information has a match with the banned DI list S305. Any Internet access request from a remote personal communication device having a match with the banned DI list 305 will be denied at S320.

If there is no match at S305, the remote personal communication device will be elevated to a second stage of communication, which may be exemplarily followed with a step of S306 determining if its login onto a secured website or webpage is correct or not. If not, S307 flags an alert and follows with S308 monitoring its subsequent login attempts. If the login is correct, access will be granted S309. A failure at S308 will invoke S310 to update a new entry of the DI information to the banned DI list. A rectification step S330 is also provided, should there exist a mistake in login from a user. Consequently, any new cybercriminal's communication device once identified at S308 and updated at S310 will be fed the latest banned DI list back to S305 to ban access on any other public webpage. In essence, method 300 will totally deprive the Internet access functionality of a cybercriminal's communication device.

The banned DI list created at S304 for the communication devices to be banned selectively comprises: (i) Internet IP addresses, domain names for servers or Internet webpages deployed by a cyberattacker, and MAC addresses; (ii) hardware DI with serial numbers embedded such as system product ID, UUID (Universally Unique Identifier), machine ID, CPU ID, wired and/or wireless circuitry such as router, Ethernet, Wi-Fi, NearLink, Bluetooth, NFC and UWB, Basic Input/Output System firmware chip (BIOS, EFI, or UEFI), motherboard or baseboard/system board/mainboard, system product, GPU (video or display), RAM memory module, memory storage drive (or disk drive), NVMe module, Video, Monitor, communication DI such as cellphone or Mobile Equipment IMEI/IMEISV/ICCID/IMSI/Mobile Broadband Service card number; (iii) software DI such as device OS installation ID, OS licensing ID, OS activation key, software program serial keys; or (iv) any of their combinations.

In brief, the third embodiment recites a punitive cybersecurity operating method providing cybersecurity protection, comprising (a) building a banned DI list for the communication devices to be banned from giving online access; (b) in response to an incoming signal issued from a communication device, obtaining the DI information of the communication device; (c) granting online access on a webpage of an Internet system, only if the DI information is obtained and not comprised in the banned DI list; (d) banning the online access, if detecting the communication device involved in an unwanted activity on the webpage; and (e) adding the communication device involved in the unwanted activity to the banned DI list.

The punitive cybersecurity operating method as recited hereinabove is for providing cybersecurity protection to an Internet to be accessed. The update step at S310 comprises syncing the banned list with other Internet systems participated in the cybersecurity protection. Thus, any communication device with its DI information once identified to get involved in the unwanted activity on one Internet system will be sweepingly banned by all of the other Internet systems as the punitive measure.

In brief, method 300 will deprive the Internet-access capability of cybercriminals' communication devices. As defined previously, DI information comprises available Internet or public IP address, domain name and/or specific URL address information if a server or Internet webpage is deployed by a cyberattacker, which are summarized as system DI, hardware DI, software DI, any of their conversions, and any of combinations of their individual component IDs. Once identified, a cybercriminal's server will be rendered inoperable of accessing the Internet. The punitive measure will further deprive the reusability of its hardware devices and per-machine-based operating system once registered in the banned DI list.

With the DI information recited, cybersecurity operating method 300 is equally applicable for providing cybersecurity protection to a personal communication device such as computer 131, 133, 133H, 136, tablet 137, smartphone or cellphone 134 and 135, autonomous cars or UAVs 140, and drones or UAS 145 as depicted in FIG. 1 for personal usage, against a cybercriminal's phishing or scamming server that hosts fraudulent Internet websites or fake software waiting for the baits to be taken.

In addition to monitor the cyberattack activities on the secured webpages as one of the unwanted activities, method 300 may further comprise another step of detecting if the personal communication device commits uploading a file bundled with malicious programs such as adware, viruses, worms, ransomware, bots, Trojan horses, keyloggers, rootkits, spyware, and cryptomining malware.

Punitive Cybersecurity Operating Method on DI-Member-Only Network

Figure 4:
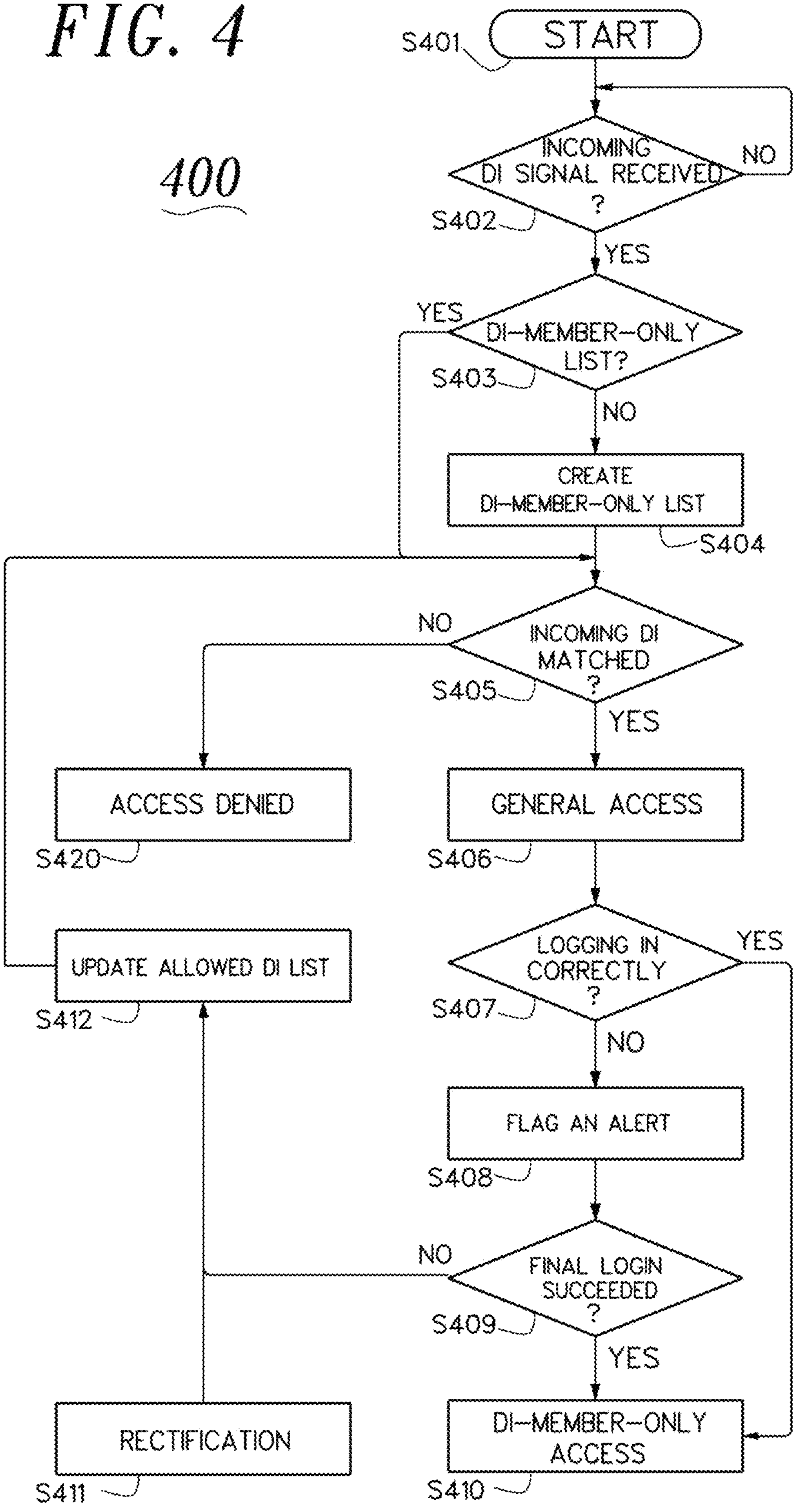
FIG. 4 is a flowchart depicting an operating method for providing DI-Member-Only network in accordance with a fourth primary preferred embodiment.

Referring now to FIG. 4, a fourth primary preferred embodiment is a cybersecurity operating method 400 providing a secured/closed/enclosed private network with flexibility beyond the conventional practice. In the conventional Internet networking, the terminology of "private network" is defined as a computer network that utilizes a private address space of IP addresses for local area networks (LANs) commonly seen in residential, office, and enterprise environments. Both the IPv4 and the IPv6 specifications have defined a particular narrow range for the private IP addresses. However, the conventional private network is confined to a specific nearby location and has to be locally connected. In contrast, the present embodiment advances to a "DI-Member-Only" network, referring to "device identification based member only" network.

The DI-Member-Only network defines its online access is restrictedly limited to the communication devices that has DI information predefined, preselected, or preregistered in the network for establishing device-ID-member-only security. In contrast to the private network, the DI-Member-Only network is not relying on the private address space conventionally defined. Thus, the communication devices participated in the DI-Member-Only network may be situated at various sites remotely, in the cloud storage, or in traveling/moving. Their connections of networking may thus be achieved by the Internet, rather than relying on the physical infrastructure of local LAN cables utilized in the conventional private network. Thus, each of the communication devices within the DI-Member-Only network can access the Internet and can thereon establish the secured/closed/enclosed private networking to each other.

Exemplary applications are the secured access to the DI-Member-Only network (including on servers or in the cloud storage) from home office or any different ISP during traveling or in moving for establishing secured/closed/enclosed private communications for military or civilian applications, secured group meetings or video conferences on top of data or document transferring, as long as a DI-Member-Only communication device is utilized.

DI-Member-Only operating method 400 starts with S401 always allowing a first stage of communication for an incoming DI signal S402 to be received. If DI-Member-Only list doesn't exist at S403 before the initial setup of method 400, it will allow an authorized administrator to create one at S404 in accordance with the communication devices to be enclosed. DI-Member-Only list S403 comprises the DI information (previously recited) of the communication devices that are predefined, preselected, or preregistered for the secured DI-member-only network application. In essence, a match to the DI information is a prerequisite for any communication device to be able to access or to establish the DI-Member-Only network connection.

The incoming signal S402 in FIG. 4 is also required to contain at least one DI packet mentioned above. S403 determines if the DI information of the incoming DI packet signal has a match to DI-Member-Only list. If no match at S405, any attempt to access the DI-Member-Only network will be denied S420. If matched, the communication device will be allowed to proceed with a second stage of communication including a general or public access S406 within the DI-Member-Only network, or a direct access to a personal account. Further provided are login steps that include S407 determining if a login is correct, S408 flagging an alert if necessary, and S409 determining if a final login is succeeded, in order to enhance cybersecurity protection in case a DI-Member-Only communication device is lost or stolen, and to obtain other purposes such as gaining an elevated privilege in higher-level security access or in confined group access S410 (DI-Member-Only Access). Optionally provided is a rectification step S411. DI-Member-Only list S403 can also be updated S412 for a new communication device to be joined or removed.

Within the DI-Member-Only network, established are the DI-Member-Only connections for applications such as web or Hypertext Transfer Protocol (http, and https), e-mail (SMTP, POP, IMAP), file transfer (FTP), remote login to hosts or remote terminals (Telnet, Secure Shell), Mobile Equipment ID (IMEI/IMEISV/ICCID/IMSI/Mobile Broadband Service card number), video and audio transferring and others. In essence, the fourth primary preferred embodiment precludes any online access from unknown communication devices and thus extinguishes any potential cyberattack through delivered bulk spam emails, attached Trojan horse viruses or malware. The embodiment of the DI-Member-Only network is particularly suitable for the applications in need of controlling the classified information with absolute cybersecurity protection required by government, military, intelligence, top-secret research organizations, financial institutions, bank-to-bank transitions, cryptocurrency transitions, corporate internal sensitive documents, and personal secrecy in the cloud.

Cybersecurity Protection on Scam Phone Calls and Messages

Figure 5:
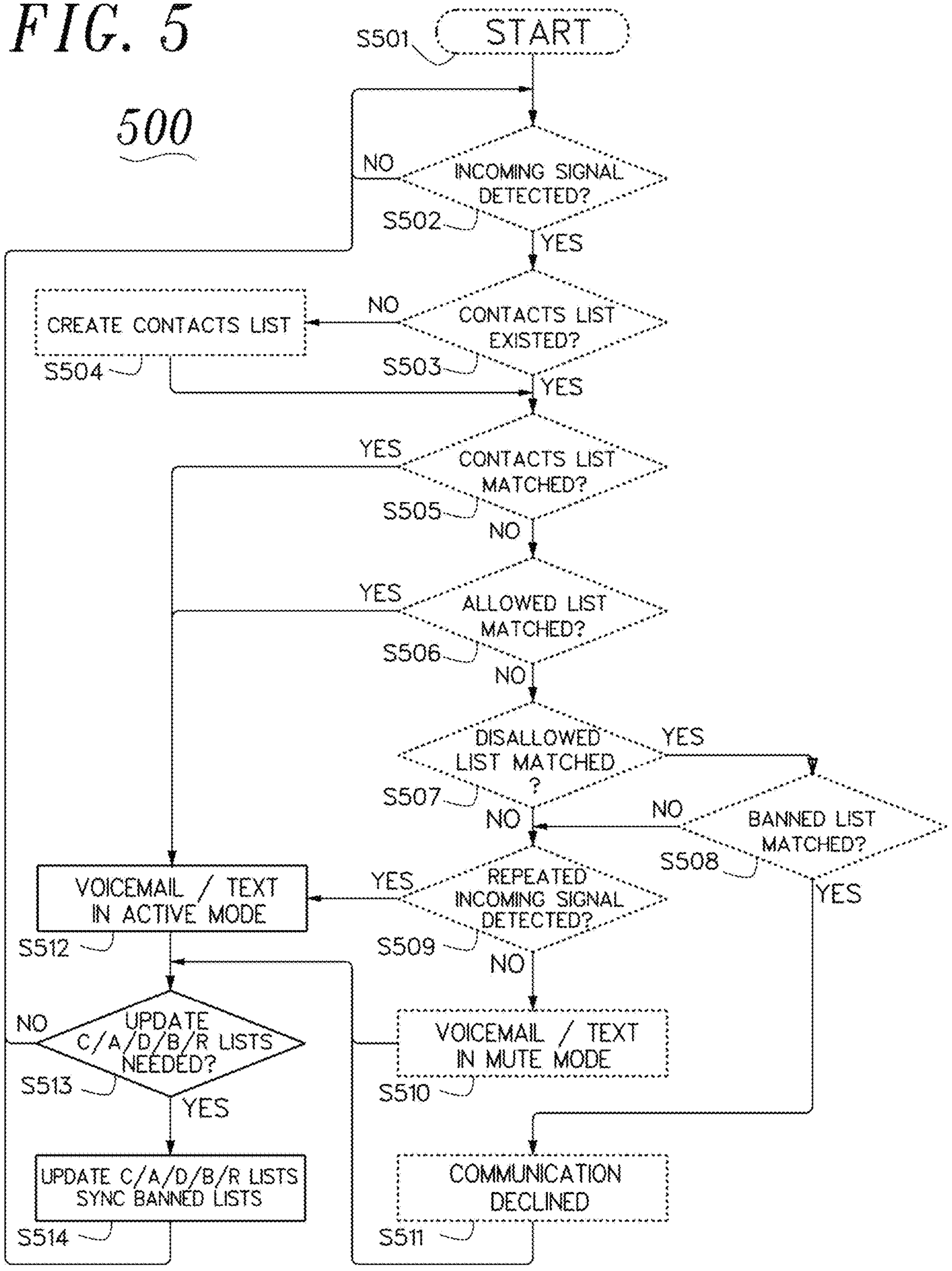
FIG. 5 is a flowchart of operating method providing cybersecurity protection to smartphones in accordance with a fifth primary preferred embodiment.

Shown in FIG. 5 is a fifth primary preferred embodiment, aiming to deal with scam phone calls and messages. Without the present invention, a conventional smartphone will instantly enter its active mode signifying at least a visual notification, even when receiving a scam incoming phone signal. If there is a scam shield app installed, the conventional practice is to block all scam-like phone calls with a visual notification popup shown "a scam-like call blocked" in active mode, in which the owner of the conventional smartphone is unnecessarily alerted and has no option to determine if it is a mistakenly blocked call or not.

The present embodiment may also utilize two stages of communication, but with different arrangements: (i) a first stage of communication in mute mode defined hereinafter to process an incoming signal of a phone call without making any audio/visual/vibration notification, wherein the first stage further includes making a decision to handle the incoming signal contingently; and (ii) a second stage of communication in active mode defined hereinafter to signify an audio/visual/vibration notification (or any of their combinations) to which prompt attention should be given while the incoming signal lasts.

FIG. 5 is further depicted in the dashed blocks from S501 to S511 referring to the first stage of communication in mute mode, and in solid blocks from S512 to S514 referring to the second stage of communication in active mode. The embodiment may not require any assistance or management remotely from a central system nor a third-party central server, just by installing an app of the present embodiment onto each of the smartphones to be implemented accordingly.

On a smartphone implemented with the present embodiment, method 500 starts with S501 silently waiting for use. In response to an incoming call or message, the smartphone will enter the step S502 in the first stage of communication or in mute mode.

The signal applicable to the smartphones in accordance with the fifth primary preferred embodiment also includes any incoming radio frequency, exemplarily NFC (Near Field Communication) at an operating frequency of 13.56 MHz. Hacker may modify various hacking gadgets available in the market for hacking NFC enabled smartphones for illegal profits. Thus, any incoming signal without ID information received at S502 will be rejected automatically, and the process will go back to the starting step S501 in accordance with FIG. 5.

If the incoming signal carrying the caller or the text message sender ID, followed will be S503 checking if a contacts list exists on the smartphone. The contacts list comprises the phone numbers and ID (identification) information such as names, phone numbers, email addresses, social network media accounts and/or a string of characters contained in the contacts of the smartphone. During the initial installation of the app, the contacts list will be created by importing the phone numbers or ID information of the contacts at the step of S504, for facilitating the performance of the app.

Followed with S503 will be sequentially compared to see if it has a match with (i) the contacts list S505 to be allowed always, (ii) an allowed list S506 comprising the contacts list S505 and others not on the contacts to be allowed, (iii) a disallowed list S507 to be disallowed, (iv) a banned DI list S508 to be always banned, in which any incoming signal/call disallowed twice will be moved to the banned list S508, and (v) a repeated list S509 to be proceeded contingently in conjunction with the disallowed list, in which it will alter the disallowed handling of an incoming call on the disallowed list.

The disallowed list S507 may be created or updated by the owner of the smartphone or synced by a remote central system. The IDs of unwanted phone calls and/or messages mainly for promoting commercial ads will be added to the disallowed list S507. When a signal/call/message ID disallowed twice by the same smartphone owner or appears at least twice from different smartphone owners reported to the central system, it has a bad reputation and will be moved to the banned list S508. Alternatively, the central system may perform the validation of the disallowed list received from the smartphone. The banned list S508 refers to the IDs associated with the scammers and/or phishers to be permanently banned. Different from the commercial ads, the scamming/phishing phone calls and or messages are intentionally fraudulent and malicious, which is becoming prevalently rampant in Asian countries. The scammers/phishers may also deploy AI to make voice and video replicas of a friend or relative of a victim for conducting a videophone scamming or phishing.

The repeated list at S509 refers to incoming DI information including caller or text message sender IDs that appear at least twice. If the answers from S505 to S509 are all resulted in NO, it means that the incoming call or text message ID is unrepeated from an unfamiliar but not-disallowed and not-banned. Thus, followed will be the step of voicemail/text S510 for leaving a voice recording or text message in mute mode even when the conventional time-dependent "Do Not Disturb" is turned off during the daytime. The voicemail/text step S510 resulted from S505 through S509 will allow a good but unfamiliar person to leave a message selected from a group consisting of a voicemail, a text message, a multimedia message, a video message, and any of their combinations. A scammer is normally reluctant to leave a traceable phone number or ID information on voicemail or text message for verification.

When matched with the disallowed list at S507, the incoming signal will be further determined if it is comprised in the banned list S508. If comprised in the banned list S508, S511 will decline the communication request. Based on the repeated list, S509 allows a disallowed once but repeated incoming signal to be giving an opportunity for leaving a voicemail or text message. The owner of the smartphone can determine if it is to be moved to the banned list or to the allowed list from the disallowed list.

In brief, the first stage of communication will automatically and selectively enter in mute mode or even time-independent Do Not Disturb mode that is even when the conventional time-dependent "Do Not Disturb" is turned off during the daytime, comprising (i) the ID verification step for all incoming signals received at S502, which will reject (ii) the C/A/D/B/R (contacts/allowed/disallowed/banned/repeated lists) classifying steps S505 to S509, (iii) the voicemail/text recording step S510 for dealing with the unrepeated incoming signal from any unfamiliar but not-disallowed ID (referring to not listed in the disallowed ID hereinafter), or any disallowed once but not banned ID, (iv) the voicemail/text recording step S510 for handling the disallowed once but repeated call, and (v) the decline or rejection step S511 for banning the incoming calls comprised in the banned list.

The second stage of communication in active mode S512 will issue an audio/visual/vibration notification for alerting an incoming call or for leaving a text message or voicemail with an audio/visual/vibration notification, when the incoming call has its ID matched with (i) the contacts list S505, (ii) the allowed list S506, and (iii) the repeated list without the disallowed list S509. When an incoming call dialed in twice from the same unfamiliar person, it signifies an urgency of the repeated caller, which is mostly not from a scammer. S513 and S514 allow to update or edit the C/A/D/B/R lists referring to the contacts, the allowed, the disallowed, the banned and the repeat lists, manually by the smartphone owner or automatically by the app. Based on voicemails or texts left in mute mode S510, the smartphone owner can readjust the disallowed but repeated ID information to the allowed list for entering the active mode in the future or moved to the banned list to be banned at S511. At the end, method 500 will go back to S501 and S502 waiting for processing another incoming signal.

The present embodiment is also applicable to handling the situation when the incoming signal at S502 refers to a text message, short message service (SMS), multimedia messaging service (MMS), or video message. The voicemail/text step at S510 resulted from S505 through S509 will allow a message to be left in mute mode for (i) an unfamiliar but not-disallowed ID and/or (ii) a disallowed once, but not-banned (referring to not listed in the banned ID hereinafter), and repeated ID. On the other hand, in active mode of communication S512, an audio/visual/vibration notification will be issued from the smartphone, when the incoming text message is sent by a person (or a smartphone or a computer) with an ID matched with the contacts list S505, the allowed list S506, or the repeated list S509.

Further, the step of S514 is rendered to update and sync the banned list on the smartphone with a central banned DI list on a central system of a provider or a third-party central server, which will verify the validity of the to-be-added banned DI information received from the smartphone. The central banned DI list will be further synced with other smartphones implemented with the present embodiment. Consequently, the present embodiment provides the cybersecurity protection to preclude a scam phone call or a scam message initiated by any identified communication device from being sent to other smartphones implemented with the cybersecurity protection, so as to achieved the punitive measure sweepingly.

Contrary to the present embodiment, the conventional practice has to place a smartphone either in the "Do Not Disturb mode" during the nighttime, or in normal operation during the daytime by turning off the "Do Not Disturb" mode. Evidently, the conventional practice will be unable to proceed with the mute mode of the present embodiment automatically during the daytime.

In summary, the present embodiment will render a smartphone selectively operable in the active mode and in the mute mode automatically and contingently during the daytime in normal operation, which may replace the conventional "Do Not Disturb" mode conventionally executed during the nighttime. Especially, the present embodiment may allow to give a prompt attention at night for not missing any emergency phone call from the contacts list.

Cybersecurity Operating System for Enabling DI Communication

Figure 6:
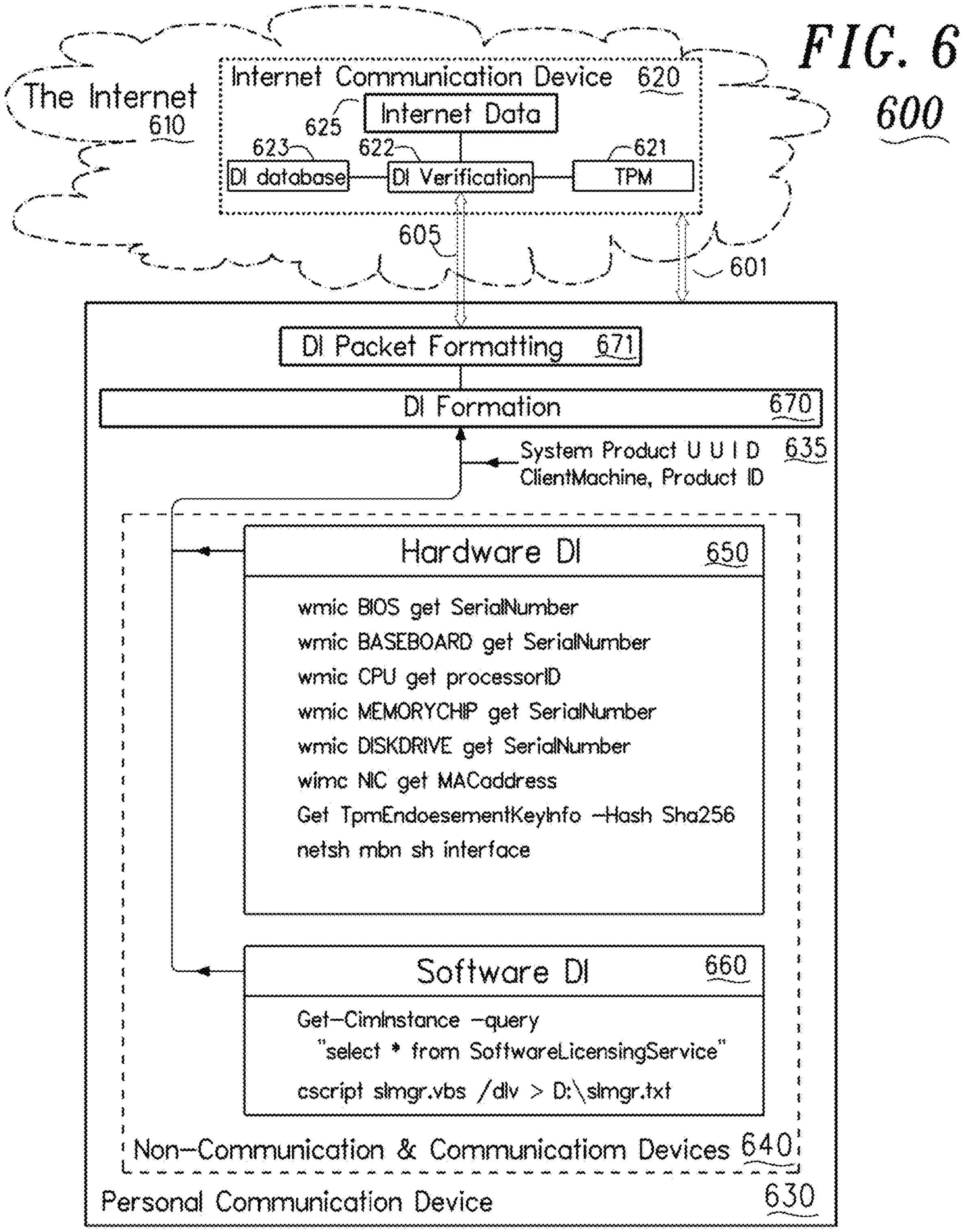
FIG. 6 depicts a punitive cybersecurity operating system for enabling DI Communication in accordance with a sixth primary preferred embodiment.

FIG. 6 depicts an exemplary diagram of a sixth primary preferred embodiment showing DI operating system 600 that provides cybersecurity protection by establishing DI communication 601 between Internet communication devices 620 (providing Internet data to be accessed) and personal DI communication devices 630 (accessing the Internet communication devices or browsing the Internet data), and thus for imposing punitive damages to cybercriminals and cyberterrorisms.

DI communication 601 is more specifically provided for bridging (i) the Internet 610, (ii) Internet communication devices 620, and (iii) personal DI communication devices 630 with DI operating system 600 installed thereon. Resided on Internet communication devices 620 each comprises TPM 621, DI verification 622 and DI database 623 for providing the punitive cybersecurity protection through DI communication 601 to Internet data 625. TPM 621 may refer to other security architectures such as Trust Zone Address Space Controller (TZASC) for a single integrated circuit board or system-on-chip SoC.

Personal DI communication device 630 is an integration of non-communication and communication devices 640 including (i) hardware devices or components microprocessor/MPU/CPU, GPU, RAM, memory circuitry or storage, firmware, ROM, TPM, embedded chip; and communication means such as communication circuitry such as router, Ethernet, Wi-Fi, NearLink, NFC, and Mobile Equipment including IMEI/IMEISV/ICCID/IMSI/Mobile Broadband Service card, and (ii) software such as operating instructions, apps, platform, and/or operating system.

In brief, depicted in personal DI communication device 630 are three major DI information: (i) system DI 635, (ii) hardware DI 650, and (iii) software DI 660.

System DI 635 exemplarily includes csproduct (Computer System Product) ID or UUID 635, ClientMachineID, ProductID and MachineID, which are either embedded or assigned during OS installation. With administrator privileges elevated, a cmd prompt of "wmic csproduct get identifyingnumber,uuid" will reveal csproduct ID and UUID 635. Other exemplary cmd prompts are (i) "Get-CimInstance-ClassName SoftwareLicensingService" for retrieving ClientMachineID; (ii) "wmic os get serialnumber" for revealing ProductID; and (iii) "reg query HKEY_LOCAL_MACHINE\SOFTWARE\Microsoft\SQMClient/v MachineId" for showing MachineID.

Hardware DI 650 representing the collection of hardware device information may be revealed by various utility apps, such as HwiNFO, System Information (from Windows manager), or by executing "msinfo32" or various command lines using Windows as an exemplary operating system. Retrievable core hardware DI 650 shown in FIG. 6 include (i) "wmic bios get SerialNumber" for getting BIOS serial number; (ii) "wmic baseboard get serialnumber" for getting the serial number of a motherboard or baseboard/system board/mainboard; (iii) "wmic CPU get processorID" for getting microprocessor/MPU/CPU ID; (iv) "wmic memorychip get serialnumber" forgetting the serial numbers of RAM memory modules; (v) "wmic diskdrive get SerialNumber" for getting the serial numbers of memory storage drives or NVMe modules; (vi) "wmic nic get MACAddress" for getting Ethernet and Wi-F MAC addresses; (vii) "Get-TpmEndorsementKeylnfo-Hash Sha256" for getting TPM ID such as TpmEndorsementKey, publicKeyHash, serial number, and Thumbprint; and (viii) "netsh mbn sh interface" for getting Mobile Broadband Service.

In brief, hardware DI 650 may include Internet IP addresses, domain name, URL address information, MAC addresses of wired and/or wireless circuitry such as router, Ethernet, Wi-Fi, NearLink, Bluetooth, NFC and UWB, Mobile Equipment ID (such as IMEI/IMEISV/ICCID/IMSI/Mobile Broadband Service card number), phone number, BIOS (Basic Input/Output System), motherboard/baseboard/system board/mainboard, microprocessor/MPU/CPU, GPU/graphics processing unit, RAM modules, memory storage drives (or disk drives), NVMe modules, TpmEndorsementKey/TPM module, and monitor.

The well-known term "BIOS" used in the present invention is generally referring to the architecture of the platform firmware used for booting and interfacing components in interaction with the operating system. It exemplarily represents not only the old BIOS, but its successors such as EFI (Extensible Firmware Interface), UEFI (Unified Extensible Firmware Interface), and others in the same class. Examples of the firmware utilized the modern UEFI specification are AMI Aptio, Phoenix SecureCore, TianoCore EDK II, InsydeH2O, and others.

Software DI 660 refers preferably to the core software programs or operating systems having software licensing services implemented on a per device basis. The uniqueness of those serial numbers or activation keys of the per-machine-based OS or core software programs will further enhance the punitive cybersecurity protection. Running a cmd in powershell "Get-CimInstance-ClassName Software-LicensingService" will reveal Windows licensing keys and ClientMachineID. Another exemplary cmd prompt is "cscript slmgr.vbs/dlv>D:\slmgr.txt" for retrieving various Windows OS licensing information and product key to a file named slmgr.txt on D drive.

Also may be as a constituent in the DI information is the computer/device OS licensing ID or activation key may be stored in memory storage during an OS installation process from a user or embedded in a memory means from OEM. Another OS antipiracy conventionally utilized is to employ a digital license linked to Microsoft account, iOS Apple ID, or other software developer servers. The newer Windows computer for instance may have an OEM product key embedded into its BIOS (including old BIOS, EFI or modern UEFI). The integration of the software DI with the software developer servers will advance the implementation to exert the punitive measure sweepingly, further rendering any communication device (including a computer, tablet, laptop, or server) inoperable completely once identified to get involved in a cyberattack.

The punitive measure may also be implemented further by sending and executing for example a Windows command prompt "TASKKILL/IM svchost.exe/F" to a cybercriminal's computer or personal communication device, so as to instantly trigger a Windows BSoD (the Blue Screen of Death). The BSoD will abruptly and unanticipatedly crash the cybercriminal's cyberactivities as another punitive measure, rendering cybercriminals' efforts fruitless in addition to the incurred punitive damages.

Also included in software DI 660 is a digital key or unique serial number such as biometric data ID for authentication that utilizes the unique biological characteristics of a person by comparing live biological data (such as eyes ID, face ID, fingerprint, voice ID and others) to biometric indicator data stored on file for a match. It is unnecessary for a personal communication device or PC to possess a hardware biological chip for detecting the live biological data as long as the digital key is "uniquely" created and/or encrypted and tied to its communication device. This is similar to TPM TpmEndorsementKey, publicKeyHash, serial number, or Thumbprint, regardless of being encrypted or not.

In brief, software DI 660 may include device OS licensing information, such as OS license, serial numbers, activation keys, activation ID, application ID, installation ID, digital license linked to software developer server (such as Microsoft account, macOS Apple ID, Google account, HarmonyOS, Linux, Android, Baidu account, WeChat, Facebook, Twitter, and others), Client Machine ID, machine ID, Product ID, user account linked to software developer server for account verification (such as email accounts, phone numbers, virtual phone numbers, and passwords), social network media accounts, digital keys, biometric data (such as fingerprints, voice ID, eyes ID and face ID), and any of their combinations.

With the DI information elaborated hereinabove, the operation of DI operating system 600 in FIG. 6 will now be elucidated hereinafter. DI operating system 600 is mainly for enabling DI communication 601 that comprises building DI database 623, setting DI formation 670 for specifying the DI information to be received and/or comprised, effectuating DI packet formatting 671, and transmitting the DI packet 605. For facilitating the illustration, DI formation 670 and DI packet formatting 671 are depicted exemplarily on personal DI communication device 630. Both DI formation 670 and DI packet formatting 671 can be achieved in a form of an app, an add-on extension (to the existing browsers) or a new browser to personal DI communication device 630. Alternatively, operating instructions may also be installed on both Internet communication device 620 and personal DI communication device 630 for the DI communication. The DI information of personal DI communication devices 630 being allowed for retrieving by or for submitting to Internet communication devices 620 is a prerequisite for Internet data 625 to be accessed without being maliciously attacked by cybercriminals.

DI formation 670 will build a set of DI information of a communication device, selectively from any of combinations of their individual IDs recited in (i) system DI 635, (ii) hardware DI 650, and (iii) software DI 660. A maximum of DI formation 670 will render a cybercriminal's personal communication device, all of its hardware components and device software programs inoperable totally if detected to get involved in a cyberattack.

DI formation 670 may further assign the DI information with an indexing ID. ClientMachineID or UUID may be suitable as the indexing ID, which may be selectively derived from a group consisting of its Internet IP address, domain name, MAC address, system product ID, UUID, machine ID, microprocessor ID, OS licensing ID, OS activation ID, and Client Machine ID. Underneath the indexing ID are the detailed system DI 635, hardware DI 650, and software DI 660 in database.

Especially, invalidation of OS licensing ID, activation ID, digital license or product key, or ClientMachineID will deprive the OS functionality of the cybercriminal's personal DI communication device 630 and even its transferability to other new communication device.

In addition to the Internet protocol form without enciphering, DI packet formatting 671 may be rendered to comprise a conversion process selected from a group consisting of encoding, enciphering, hashing, and any of their combinations for formatting at least one DI packet into the string of bits as a digital fingerprint of the specified DI information determined by DI formation 670.

Registering all of hardware DI 650 to the banned DI list recited in FIGS. 1-6 will deprive any potential reusability on each of the non-communication devices or components, exemplarily listed in FIG. 6 such as Internet IP addresses, domain name, MAC/router/Ethernet/Wi-Fi/NearLink/Bluetooth, Mobile Equipment (IMEI/IMEISV/ICCID/IMSI/Mobile Broadband Service card number), Basic Input/Output System firmware chip (BIOS, EFI, or UEFI), motherboard, CPU, GPU/graphics processing unit, RAM modules, memory storage drives (or disk drives), NVMe modules, TPM module, and monitor for reuse as a part in rebuilding a new communication device.

Hereinabove the term "ID" may contain numbers, letters, character, and other typographical symbols, or may consist entirely of a character string.

In brief, the punitive measure created by the present invention for imposing punitive damages to cybercriminals and cyberterrorisms includes (i) disabling online or Internet access functionality of their communication devices, (ii) crippling their basic OS operation, and (iii) depriving the reusability of their hardware devices or components once registered in the banned DI list. Accordingly, the punitive measure will force a cybercriminal to purchase a brand new communication device and a new OS, incurring punitive damages each time when a cyberattack activity is detected.

Aside from the punitive damages, the cybercriminal will be further forced to spend time and effort to set up new email addresses/accounts and cellphone numbers, when the embodiments are implemented collaboratively with such as Google (providing search engine, and Google account linked to Google app store and Google cloud drive), Microsoft (providing Microsoft account, app store, OpenAI, and web browser linked to OS activation), or Apple (providing iOS and Apple ID linked browser and Apple store) for instance. Other potentially banned are social network media accounts (such as Twitter, Facebook and its associated Messenger, WeChat, Line, ShareChat, Instagram, QZone, Weibo, VK, Tumblr, Baidu Tieba, and LinkedIn), brokerage accounts for trading stocks, bank accounts, credit card accounts, cryptocurrency accounts, online shopping accounts (such as Amazon and eBay), taxing service, government service, social security account service, health care service, and others relied on the need of email or phone number verification.

DI packet formatting 671 will incorporate the DI information exemplarily recited previously to form at least one DI packet referring to a string of bits, which may be a small segment of a larger message. The purpose of DI packet formatting 671 may be achieved by employing a new type of browsers or an extension incorporated to an existing browser for generating a DI packet to be sent to an Internet webpage on Internet communication device 620. The DI information may be carried in the payload field of a DI packet, in which its length field of IPv6 (and IPv4) has a size of 16 bits, enough for specifying a maximum length of 65535 octets to contain the DI information without involving in jumbo payload option. Optionally, DI packet formatting 671 may utilize part of the source address header (of communication device 630) or header extensions to include the indexing ID that is assigned to represent the device title of a DI information set of personal DI communication device 630.

When Internet communication device 620 receives an incoming signal for online access request issued from personal DI communication device 630, DI verification 622 will verify if the incoming signal contains at least one DI packet. If not, no online access will be granted. DI operating system 600 will instruct personal DI communication device 630 to reperform the building of DI formation 670, the effectuating of DI packet formatting 671 and the transmitting of a new DI packet 605.

DI database 623 comprises at least one list for a specific purpose or for various levels of authority in accessing or controlling data, exemplarily a banned DI list and a DI-Member-Only list.

The banned DI list is built to comprise the communication devices involved in a cyberattack to be banned from giving any online access on Internet communication device 620. If the incoming signal contains an indexing ID, DI verification 622 will compare the indexing ID with the banned DI list to see if there is a quick match. Carrying the indexing ID in the source address header or header extensions will further help Internet communication device 620 to decline an Internet data access request even without proceeding with the transmission of the Internet data access request. Thus, preferably organized in the banned DI list are the indexing IDs each comprising its respective DI information set retrieved from the DI packet received from DI packet formatting 671. Even if no match, the detailed DI information set underneath the indexing ID will be further validated. In essence, Internet data 625 will be accessible to personal DI communication device 630 only when its DI packet sent out is determined to meet the requirement of DI verification 622.

The process of DI database 623 may include building, updating, and syncing. When DI operating system 600 detects cyberattacking from a communication device, the banned DI list will be updated to include the DI information set identified, which will be further synced with a central DI database resided on a central server and the other DI databases on other Internet communication devices.

If Internet communication device 620 requires to possess the highest level of cybersecurity protection, the DI-Member-Only list will be deployed. As recited previously, Internet communication device 620 will serve as the central server for providing the DI-Member-Only network that will preclude unauthorized access from any unknown communication device. The DI-Member-Only network will enable a DI-Member-Only communication device to be able to perform online access to the central server through a URL, FTP, Telnet, Secure Shell, or other communication protocols from various geological locations or different ISPs. Once connected to the central server, it can further establish connection with other DI-Member-Only communication devices. Implemented with DI operating system 600, the central server will offer the cybersecurity protection to the DI-Member-Only communication device when surfing the Internet.

The DI-Member-Only network may be further integrated with the banned DI list, not giving any opportunity to a cybercriminal's communication device for requesting a connection from the very beginning.

With respect to the building of the DI database, the present invention will further employ a web crawler to crawl across the webpages carrying potential cyberattacks from malicious programs such as adware, viruses, worms, ransomware, bots, Trojan horses, keyloggers, rootkits, spyware, and cryptomining malware. Google, Bing, Yahoo, or other search engines will be utilized to search suspicious file extensions or specific words for analysis. In most cases, these search engines have already indexed all URLs and webpages, which will facilitate the web crawling for building the database. The web crawling will visit these URLs indexed by the search engines, by communicating with web servers that respond to those URLs, which will identify all the hyperlinks in the retrieved webpages and will download the files to a sandbox or an isolated computer system for analysis. From the analysis, any URL or hyperlink containing the fake or malicious programs deployed by a cyberattacker will be added to the DI banned list.

DI operating system 600 may further build a warned DI list comprising the domain names, the webpages or the URLs that host torrents with archived and/or compressed files that are installable, but are not yet fully analyzed to determine if they will incur a cyberattack. In brief, the DI database may be adapted to comprise the DI-Member-Only list, the banned DI list, the warned DI list, and others for various purposes or various levels of authority in accessing or controlling.

While the recitations hereinabove are focused on establishing DI communication utilizing the architecture of the Internet browsing, it is evidently that the term "DI packet" defined in the present invention will not be limited to the conventional term "packet" in format. Instead, the DI packet may be simply a string of bits comprising the specified DI information of a communication device to be controlled, which may not be in Internet browsing form such as IPv4 or the IPv6.

In essence, the DI packet is equivalent to the digital fingerprint representing the DI information selected from a group consisting of the IDs derived from the system DI, the hardware DI, the software DI, any of their conversions, and any of combinations of their individual component IDs. The conversions or transformations may be derived from encoding, enciphering, hashing, and any of their combinations. Hash values or cryptographic hash values as digital fingerprints used in the present embodiment may not require deciphering, so long as the representations of the DI information are stored for comparison.

The present invention may employ hashing algorithms such as MD5 (Message Digest 5) or SHA (Secure Hash Algorithm) to provide privacy if necessary to user accounts, passwords and/or OS licensing ID. Hashes are the output of hashing algorithms, which once created will be stored as permanent hashed DI information on personal DI communication device 630 for use in DI formation 670 and DI packet formation 671. When detecting a cyberattack activity, Internet communication device 620 will store the hashed DI information of a cybercriminal's communication device identified to the banned list on DI database 623 for imposing the punitive damages recited previously.

Further applicable is to provide the DI-based cybersecurity protection to other communication platforms such as FTP (file transfer protocol), Telnet, Secure Shell, or other communication protocols that are conventionally relying on utilizing the user accounts-and-passwords platform for a login to access a host or a remote terminal. With the recent advent of AI and quantum computing, the user accounts-and-passwords platform will become even much vulnerable to the cybercriminals.

DI Chip for Enabling Trusted Inbound and Outbound Communications

The present invention may further be implemented by a DI chip (module or firmware) enabling trusted DI communication and cybersecurity protection for both inbound and outbound communications. DI module 733 shown in FIG. 7 and DI chip 800 in FIG. 8 each is approximately a miniature of cybersecurity protection means 190 recited previously.

Figure 7:
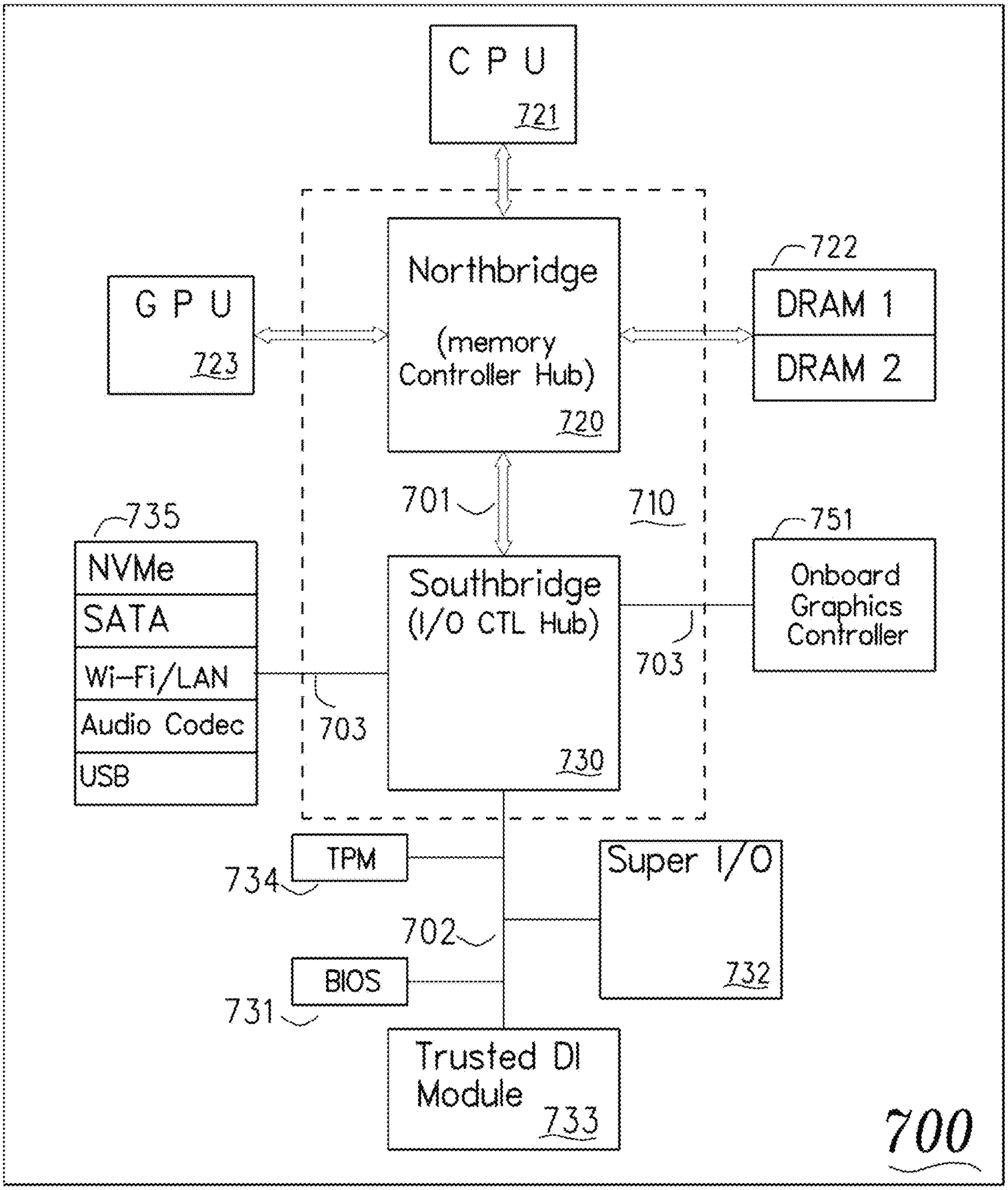
FIG. 7 is a block diagram showing a DI module in accordance with a seventh primary preferred embodiment.

Depicted in FIG. 7 is a block diagram showing the location of DI module 733 on motherboard 700 having a core logic chipset architecture of chipset 710 that consists of northbridge 720 and southbridge 730. Northbridge 720 (memory controller hub) is connected directly to CPU 721, DRAM or volatile memory 722 and GPU 723 via the front-side bus (FSB) 701 to handle high-performance tasks. Southbridge 730 (I/O controller hub) handles I/O functions providing (i) LPC (Low Pin Count) bus 702 for system BIOS 731, super I/O 732, DI module 733, and TPM 734, and (ii) PCI/PCIe bus 703 for connecting NVMe/SATA/Wi-Fi/LAN/Audio Codec/USB 735.

DI module 733 is preferably embedded or soldered onto motherboard 700. In addition to FIG. 7 showing the hardware components or parts are assembled removably hereinabove, motherboard 700 may be in form of a single integrated circuit board such as SoC used in a smartphone.

When motherboard 700 boots, CPU 721 pins are reset and registers are set to jump to BIOS 731 address so as to run POST (Power On Self Test), to initialize BIOS 731, chipset 710, system buses 701-703, and other hardware devices such as DRAM 722, GPU 723, super I/O 732, DI module 733, TPM 734, and NVMe/SATA/Wi-Fi/LAN/Audio Codec/USB 735. During the initialization, BIOS 731 will interface, collect and provide the initialized hardware DI information to DI module 733 for storage and for use in conjunction with the proceeding of the cybersecurity protection.

Hardware DI information is preferably retrieved by interfacing a device having a motherboard for at least one selected from a group consisting of computer system product ID, UUID, product ID, Internet IP address, MAC addresses of wired and/or wireless communication circuitry integrated on the motherboard, Mobile Equipment ID, phone number ID, Basic Input/Output System firmware ID, motherboard ID, microprocessor ID, graphics processing unit ID, RAM module ID, memory storage ID, TPM module ID including generated ID, DI chip, monitor ID, and any of their combinations.

The importance of FIG. 7 lies in the fact that function of DI module 733 will start to operate once Basic Input/Output System is initiated, providing the cybersecurity protection potentially at the same level of TPM 734 before OS is loaded. DI module 733 comprises control firmware with instructions and memory circuitry. The instructions are provided for (i) setting the content of the mentioned IDs to be focused and selected and/or comprised for forming DI information; and (ii) formatting the DI information in a form suitable for transmitting in order to enable trusted DI communication to both motherboard 700 for inbound connection and remote communication devices for outbound connections. The memory circuitry comprising persistent/nonvolatile memory module for storing the DI information to be used as the device fingerprint of the hardware components and motherboard 700.

Figure 8:
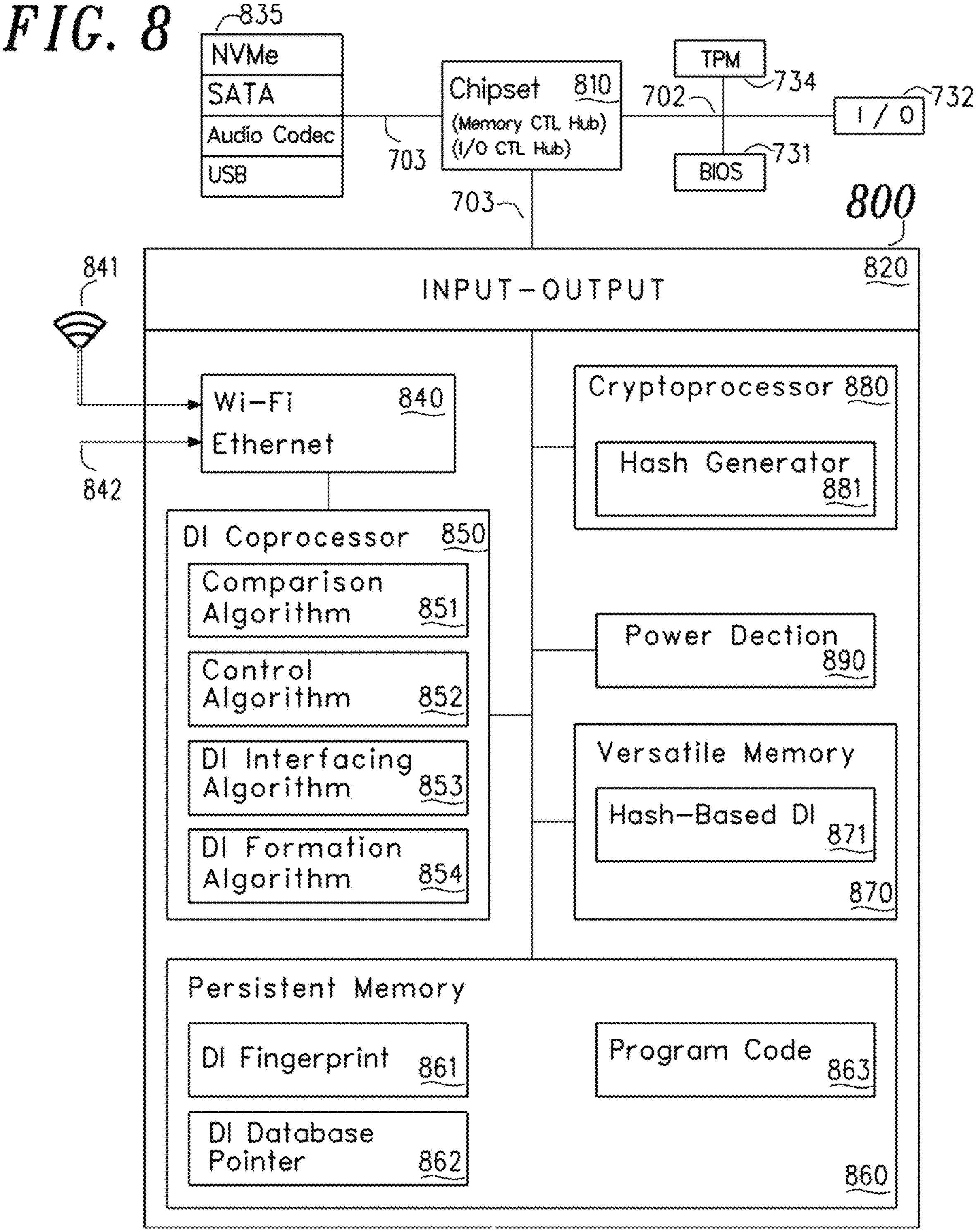
FIG. 8 is a block diagram of a DI chip integrated with communication circuitry, in accordance with an eighth primary preferred embodiment.

FIG. 8 further depicts DI chip 800 in circuit connection with integrated chipset 810 having memory and I/O controller hubs, via PCI/PCIe bus 703 connecting NVMe/SATA/Audio Codec/USB 835, in which NVMe/SATA/Audio Codec may be replaced by memory circuitry (SoC on an integrated motherboard utilized in a smartphone) or flash card and Audio Codec firmware. Similar to FIG. 7, LPC bus 702 is provided for connecting system BIOS 731, super I/O 732 and TPM 734.

DI chip 800 has input-output bus 820 in circuit connection with PCI/PCIe bus 703. Different from DI module 733 in FIG. 7, DI chip 800 is integrated with communication circuitry 840 comprising wireless communication circuitry shown as Wi-Fi 841 and wired communication circuitry as Ethernet 842 for receiving incoming signals externally. Further comprised in DI chip 800 are DI coprocessor 850, persistent memory 860, versatile memory 870, cryptoprocessor 880, and power detection 890. Persistent memory 860 is nonvolatile and provided for storing DI fingerprint (or biometrics) 861 and DI database pointer 862, while versatile memory 870 offers memory needed during the initialization and operation of DI chip 800.

When a communication device implemented with the present embodiment is booted, DI chip 800 will be ensured to function properly with power detection 890 along with BIOS 731 initialization. DI coprocessor 850 comprises instructions executable by comparison algorithm 851, control algorithm 852, DI interfacing algorithm or means 853, and DI formation algorithm 854. DI interfacing algorithm 853 is provided to interface with BIOS 731 (also EFI or UEFI) for obtaining system DI 635, hardware DI 650 and embedded software DI 660 recited in FIG. 6, when initialized. After device OS is loaded, DI interfacing means algorithm 853 will further obtain software DI 660 from installation such as per-machine-based software program serial keys, especially OS licensing information. The obtained DI information will be stored in persistent memory 860 as DI fingerprint (or biometrics) 861.

DI formation algorithm 854 will proceed with DI formation 670 and DI packet formatting 671 recited in FIG. 6. DI information obtained from system DI 635, hardware DI 650 and software DI 660 may be wholly retained for storage in persistent memory 860 and/or formatted into specified or core DI information by DI formation 670 in accordance with the six primary preferred embodiment previously recited. DI packet formatting 671 may form the DI information into a string of bits in the Internet protocol format for accessing the Internet, or communication protocols such as FTP, Telnet, Secure Shell, or hashed DI information in conjunction with cryptoprocessor 880, or others. DI formation 670 may further select and format DI information into a specific size for instance 256-1024 bits, or to the upper limit to fit within the 2048 bits if a SRK (RSA) is employed, or a larger size to be defined in future.

DI formation algorithm 854 may be further adapted for setting a portion of each of the IDs to be focused and selected (from the system DI, the hardware DI and/or the software DI) for formatting into a string of bits in a predefined size suitable for transmitting to a remote communication device so as to enable outbound connections with the DI communication.

Control algorithm 852 may be further adapted for building a DI database for the DI chip to be able to control if an online access request from a remote communication device should be granted or not, and wherein the DI database comprises the DI information of the remote communication devices to be controlled, and the DI information is selected from a group consisting of the IDs recited previously and any of combinations of their individual component IDs. DI coprocessor 850 may be further adapted for building the database to comprise a banned DI list for the remote communication devices to be imposed with punitive damages, wherein the banned DI list comprises DI information selected from a group consisting of the IDs and any of their combinations to be banned, and the punitive damages are adapted to render the IDs comprised in the banned DI list incapable of obtaining Internet and/or online access. The control means may be further adapted for syncing the banned list with a central banned list resided on a remote central system, if the banned list is modified or needed updating from the central banned list.

DI fingerprint 861 may comprise all of the available DI information obtained from DI interfacing algorithm 853, specific/selected/core DI information derived from DI formation algorithm 854, and hashed DI information encoded by hash generator contained in cryptoprocessor 880.

Further stored in persistent memory 860 is DI database pointer 862 for pointing to the physical location on memory storage such as NVMe/SATA represented by NVMe/SATA/Audio Codec/USB 835. The DI database associated with DI database pointer 862 comprises the DI information of the remote communication devices to be controlled as recited previously, which may include DI-Member-Only list, allowed DI list, banned DI list, and/or warned DI list as recited previously.

In the conventional practice, TPM 734 comprises a secure cryptoprocessor that is necessary (i) for generating and storing secured information such as user credentials, keys, passwords, fingerprints or certificates, and (ii) for performing cryptographic operations such as asymmetric encryption, decryption and cryptographic hashing. The secure cryptoprocessor further comprises a random number generator, a key generator and a hash generator for generating public and private keys.

In contrast, a combination of the IDs selected from system DI 635, hardware DI 650, and software DI 660 as recited in the present invention will form a string of bits essentially unique enough without requiring any random number generator, key generator or hash generator relied on by TPM. Even if hashed for satisfying a privacy concern, the hashed or enciphered DI information is still unique enough to possess the functionality of TPM 734 and will provide a root of trust for remotely attesting a computer s specified hardware DI and software DI. Especially, the hardware DI may be designated to include the detailed level of individual hardware components, which is a fact not achievable by TPM. Further, DI chip 800 will provide DI fingerprint 861 stored in persistent memory 860 for enabling trusted DI communication with cybersecurity protection without requiring decryption, as exemplarily recited in the DI-Member-Only network detailed in FIG. 4. Most important is DI chip 800 is for a totally different purpose that is to provide cybersecurity protection and to impose punitive damages to cybercriminals and cyberterrorisms' communication devices, on top of enabling the trusted inbound and outbound communications.

Another prominent embodiment of FIG. 8 is stemmed from the integration of communication circuitry 840 comprising wireless communication circuitry shown as Wi-Fi 841 and wired communication circuitry as Ethernet 842 for receiving incoming signals externally. DI coprocessor 850 will derive the DI information when receiving an incoming signal issued from a remote Internet communication device. Comparison algorithm 851 will be proceeded for validating the derived DI information from communication circuitry 840, in conjunction with DI database pointer 862 pointing to the database stored in NVMe/SATA that may comprise an allowed list, a banned list and/or a warned DI list. DI coprocessor 850 will allow or disallow if a communication request should be established for the incoming signal from the remote Internet communication device. Thus, cybersecurity protection is achieved for the inbound communication as recited in previous embodiments, in which DI chip 800 is functioning as a miniature of isolated cybersecurity protection means 190 to protect a personal communication device. If matched with the banned list, any link such as Internet IP address, domain name, URL address from the incoming signal (from a cybercriminal's Internet server) will be automatically banned for browsing. Thus, any virus will be precluded from getting further into NVMe/SATA. Cyberattacks will be extinguished from the very beginning, ensuring the cybersecurity protection to the personal communication device. On the hand, DI fingerprint 861 stored in persistent memory 860 will be instantly available for transmitting as a device certificate to a remote Internet communication device for giving trusted outbound communication.

In essence, DI chip 800 will preclude any inbound cyberattack from getting into device memory storage NVMe/SATA and will provide a DI fingerprint as a trusted certificate for outbound communication. While the reciting hereinabove is exemplarily given to a personal communication device, DI chip 800 functioning similarly to cybersecurity protection means 190 is also applicable for implementation to an Internet sever for achieving cybersecurity protection with punitive damages as recited previously. For instance, when the DI database stored on memory storage NVMe/SATA comprises DI-Member-Only list, DI chip 800 will enable the DI-Member-Only network previously recited. Also, a banned list will ban a cybercriminal communication device from getting any Internet access.

In summary, the seventh/eighth primary preferred embodiments recites a DI module/chip for trusted inbound and outbound communications. The DI module or the DI chip comprises: (a) input/output means for establishing circuit connection with hardware components; (b) DI interfacing means in circuit connection with the input/output means, for obtaining DI information recited previously; and (c) control means comprising a coprocessor and instructions or algorithms. The algorithms are for (i) setting the content of the IDs to be focused and selected and/or comprised for forming the DI information; and (ii) formatting the DI information in a form suitable for transmitting so as to provide the trusted DI communications to a remote communication device.

The DI chip further comprises persistent memory circuitry for storing the DI information as the device fingerprint for enabling the trusted inbound and outbound communications. The DI chip may further comprise a cryptoprocessor for encoding, enciphering, and/or hashing the DI information as the device fingerprint for enabling outbound connections with DI communication. The DI chip further comprises communication circuitry for receiving and for controlling the traffic flow of an incoming signal from a remote communication device, so as to preclude any inbound cyberattack from getting into device memory storage DI interfacing means may be embedded firmware, instructions, algorithm, or coprocessor for retrieving DI information from Basic Input/Output System firmware The control means may set a portion of each of the IDs to be focused for formatting into a string of bits in a predefined size suitable for transmitting to the remote communication device so as to enable outbound connections with the DI communication. The control means may build a DI database for the DI chip to be able to control if an online access request from a remote communication device should be granted, wherein the DI database comprises the DI information of the remote communication devices to be controlled. The DI information may be selected from a group consisting of the IDs recited hereinabove and any of their combinations. The DI database may comprise a banned DI list for the remote communication devices to be imposed with punitive damages, (i) wherein the banned DI list comprises the communication devices to be banned, and (ii) wherein the punitive damages are adapted to render the IDs comprised in the banned DI list incapable of obtaining Internet and/or online access, and the device OS invalid. The control means may be adapted for syncing the banned list with other Internet systems participated in the cybersecurity protection, so that any communication device once identified to get involved in a unwanted activity on one Internet communication device will be sweepingly banned by all of the other Internet communication devices as a punitive measure.

In essence, the present invention will provide the DI-based cybersecurity protection instantly available for use that is also applicable to enhance the conventional communication platforms such as web or Hypertext Transfer Protocol (http, and https), e-mail (SMTP, POP, IMAP), FTP (file transfer protocol), Telnet, Secure Shell, or other communication protocols that are conventionally relying on utilizing the user accounts-and-passwords platform for a login to access a host or a remote terminal.

There are also improved secured communications conventionally based on cryptographic keys, TPM and two-step verification methods. However, the recent advent of AI and quantum computing will render the user accounts-and-passwords platform, the cryptokey and the TPM methods vulnerable to the cybercriminals. Similarly, cryptocurrency will be also vulnerable when facing the power of quantum computing, unless implemented with the DI communication.

Also, cyberattackers may assemble enough information to recover secret keys that underpin the security and confidentiality of a cryptographic algorithm, by carefully monitoring characteristics such as power consumption, sound, electromagnetic emissions, or the amount of time it takes for an operation of cryptographic keys to occur. On the other hand, the two-step verification is not practical when waiting time is not permitted in military applications or in an emergency situation, when a smartphone is lost, unable or has no signal to be used for verification, or when the linked email account cannot be opened due to various reasons such as being blocked by countries or geological locations.

To overcome the major disadvantages of the cybersecurity protection offered by conventional wisdom, the present invention provides the DI communication for proactively imposing punitive damages to cybercriminals and cyberterrorisms by rendering their communication devices and the reusability of their hardware components once identified to get involved in malicious activities incapable of gaining future access to the Internet and or network. The OS of the communication devices deployed by the cybercriminals and cyberterrorisms can be rendered invalid, when the present invention is implemented by OS developers such as Microsoft, Apple, Google, Harmony and others. Thus, for the first time, no cybercriminal can practice any malicious cybercrime without being exposed to a risk of the punitive damages. Equally important are the facts that the characteristics of the DI chip, communication device, smartphone, system, and operating system will not be hackable by AI or quantum computing, and will enable DI communication with cybersecurity protection instantly available without waiting for a two-step confirmation. Especially, the embodiment of the DI-Member-Only network is particularly suitable for the applications in need of controlling the classified information with absolute cybersecurity protection.

DI-Encrypted Intercommunication with Cybersecurity and Cryptography Protections

A ninth primary preferred embodiment is a method/algorithm or chip/module for establishing DI-encrypted intercommunication with cybersecurity and cryptography protections, which is derived from a combination of the primary preferred embodiments and the drawings previously presented.

The DI-encrypted intercommunication with cybersecurity protection is evidently illustrated in all of the eight primary preferred embodiments in conjunction with FIGS. 1-8.

The DI-encrypted intercommunication with cryptography protection is exemplarily recited from the sixth through the eighth primary preferred embodiments and FIGS. 6-8.

The content under the subtitle of "Cybersecurity Operating System for Enabling DI Communication" recites cryptography exemplarily by hashing algorithms to provide privacy if necessary for use in DI formation. Further recited previously is that in FIG. 6, DI packet formatting 671 may be rendered to comprise a conversion process selected from a group consisting of encoding, enciphering, hashing, and any of their combinations for formatting at least one DI packet into the string of bits as a digital fingerprint of the specified DI information determined by DI formation 670.

FIG. 7 depicts DI module 733 for "enabling trusted inbound and outbound communication" that is the subtitle recited previously, corresponding to establishing the DI-encrypted intercommunication with cybersecurity protection as well as with cryptography protection.

FIG. 8 depicts DI chip 800 comprising DI coprocessor 850, persistent memory 860, versatile memory 870, cryptoprocessor 880, and power detection 890. Persistent memory 860 is nonvolatile and provided for storing DI fingerprint (or biometrics) 861. Cryptoprocessor 880 is provided for encoding, enciphering, and/or hashing the DI information as the device fingerprint for enabling outbound connections with DI communication, as well as for decrypting, decoding, or deciphering encrypted data.

DI fingerprint 861 may comprise all of the available DI information obtained from DI interfacing algorithm 853, specific/selected/core DI information derived from DI formation algorithm 854, and hashed DI information encoded by hash generator contained in cryptoprocessor 880.

In essence, the IDs recited for representing a fingerprint of a communication device may be generated from cryptoprocessor 880 in addition to the DI interfacing. The fingerprint is functioning as a unique authentication of its host communication device/system to be presented or transmitted to an external trusted communication device/system. Preferably, cryptoprocessor 880 utilizes the fingerprint as a device-dependent encryption key for encrypting data, forming a DI-encrypted request, feedback, response message and/or command, to be transmitted out and received in.

Consequently, the combination of the sixth through the eighth primary preferred embodiments in conjunction with FIGS. 6-8 previously presented recites the ninth primary preferred embodiment, in which a DI-encrypted intercommunication with cryptography protection is further achieved.

In summary, the ninth primary preferred embodiment is a DI chip/module, an algorithm, or a method for DI-encrypted intercommunication, comprising: (a) generating IDs in a predefined size for use as a fingerprint of a first device/system; (b) presenting the fingerprint as a unique authentication of the first device/system to a second device/system to be intercommunicated with, so as to provide cybersecurity protection to the DI-encrypted intercommunication; (c) requesting the second device/system to utilize the fingerprint as a device-dependent encryption key for encrypting data to be transmitted to the first device/system, so as to provide cryptography protection to the DI-encrypted intercommunication; and (d) at the first device/system, decrypting the data encrypted with the device-dependent fingerprint. The data may be an OS, software program, or command executable only if there is the presence of the device-dependent fingerprint, for providing software antipiracy.

Finally, it is clearly understood that such embodiments are provided by way of illustration and example only and are not to be taken by way of limitation as numerous variations, changes, modification, omissions, adaptations and/or alterations, combinations and substitutions will occur to those skilled in the art without departing from the invention herein. Furthermore, the steps of the processes and/or the methods disclosed in the examples may be modified in any manner, including by reordering steps and/or inserting or deleting steps. Accordingly, it is intended that the invention be limited only by the spirit and scope of the appended claims.

The invention claimed is:

1. A DI (device identification) chip and/or module for DI-encrypted intercommunication, comprising:

(a) input/output pins for establishing circuit connection with a host device and/or system;

(b) microcontroller circuitry in circuit communication with said input/output pins;

(c) persistent memory accessible to said microcontroller circuitry; and (d) an algorithm stored/embedded stored and/or embedded in said persistent memory and executable by said microcontroller circuitry, comprising:

(i) generating device IDs (identification numbers) of said host device and/or system, as its device fingerprint;

(ii) presenting said device fingerprint to an external device and/or system to be intercommunicated;

(iii) requesting said external device and/or system to utilize said device fingerprint as an encryption key for encrypting data to be transmitted to said host device and/or system so as to provide said DI-encrypted intercommunication with cryptography protection;

(iv) building a DI database comprising device fingerprints of remote devices to be controlled;

(v) verifying if a corresponding device fingerprint of a remote device is submitted; and (vi) comparing said corresponding device fingerprint with said DI database for a match to determine if said DI-encrypted intercommunication should be granted.

2. The DI chip and/or module of claim 1 further comprises DI memory for said algorithm executable by said microcontroller circuitry without relying on host memory contained in said host device and/or system.

3. The DI chip and/or module of claim 1 further comprises DI communication circuitry in circuit connection with said microcontroller circuitry for receiving incoming signals, so as to isolate and to preclude any inbound cyberattack from first getting into said host device and/or system.

4. The DI chip and/or module of claim 1, wherein said algorithm further comprises a cryptography algorithm for performing said generating.

5. The DI chip and/or module of claim 1, wherein said generating is adapted to comprise (i) interfacing said host device and/or system for retrieving respective IDs of hardware components and/or software; and (ii) setting which of said respective IDs to be selected as said device fingerprint.

6. The DI chip and/or module of claim 1 is adapted to a form selected from a group consisting of at least one isolated module, at least one single adapter board, at least one integrated component, at least one chip, at least one SoC (system-on-chip), at least one circuit board, at least one coprocessor, integrated circuitry, firmware, and any of their combinations suitable for said algorithm to be stored and/or embedded therein.

7. A non-transitory computer readable medium storing an algorithm executable by a device and/or system for proceeding with DI-encrypted intercommunication, comprising:

at said device and/or system, in response to an incoming signal received from an external device for intercommunicating:

(a) in accordance with a determination that a device fingerprint is not detected from said incoming signal, requesting said external device to perform internal interfacing for generating and submitting its device fingerprint in a predefined format;

(b) in accordance with a determination that a device fingerprint in said predefined format is detected and verified, granting said DI-encrypted intercommunication;

(c) utilizing said device fingerprint as an encryption key for encrypting data to be transmitted to said external device;

(d) transmitting said data encrypted to said external device, wherein said data encrypted can be decrypted only by said external device with presence of said device fingerprint;

(e) building a DI database comprising device fingerprints of remote devices to be controlled;

(f) verifying if a corresponding device fingerprint of a remote device is submitted; and (g) comparing said corresponding device fingerprint with said DI database for a match to determine if said DI-encrypted intercommunication should be granted.

8. The algorithm of claim 7, wherein said requesting comprises sending instructions executable by said external device for generating its device fingerprint in said predefined format to be used by said external device for decryption when said data encrypted by said device and/or system is received.

9. The algorithm of claim 7, wherein said requesting further comprises instructing said external device to perform hardware interfacing for retrieving device IDs from hardware components of said external device.

10. The algorithm of claim 7, wherein said requesting further comprises instructing said external device (i) to perform hardware interfacing for retrieving respective IDs of hardware components and/or software; and (ii) to set which of said respective IDs to be selected as said device fingerprint in said predefined format, so that said device fingerprint is rendered device-dependently unique.

11. The algorithm of claim 7, wherein said requesting further comprises instructing a cryptography algorithm of said external device to generate said device fingerprint.

12. A method for establishing DI-encrypted intercommunication, comprising:

(a) at a first digital device and/or system, generating device IDs as its device fingerprint;

(b) at said first digital device and/or system, presenting said device fingerprint to a second digital device and/or system to be intercommunicated with;

(c) at said second digital device and/or system, utilizing said device fingerprint as an encryption key for encrypting data to be transmitted to said first digital device and/or system;

(d) at said first digital device and/or system, decrypting said data encrypted with said device fingerprint;

(e) building a DI database comprising device fingerprints of remote digital devices and/or systems to be controlled by said second digital device and/or system;

(f) at said second digital device and/or system, verifying if a corresponding device fingerprint of a remote digital device and/or system is submitted; and (g) comparing said corresponding device fingerprint with said DI database for a match to determine if said DI-encrypted intercommunication should be granted or not.

13. The method of claim 12, wherein (i) said generating is adapted to render said device fingerprint device-dependently unique so that said data encrypted can be decrypted only by said first digital device and/or system; (ii) said presenting is adapted to present said device fingerprint for authentication of said first digital device and/or system; (iii) said data encrypted is rendered to be selected from a group consisting of a message, a code, a document, a photo, a paid and/or subscribed A/V (audio/video), a subscribed channel, a control command exclusively for controlling said first digital device and/or system, a paid OS or software program executable exclusively only at said first digital device and/or system with presence of said device fingerprint for decryption, and any of their combinations; and (iv) said decrypting is rendered to require said first digital device and/or system to perform said generating for said device fingerprint for verification; so as to provide antipiracy protection as well as cryptography protection on exclusive distribution of control commands and/or digital information.

14. The method of claim 12 further comprises executing a cryptography algorithm contained in said first digital device and/or system for performing said generating.

15. The method of claim 12 further comprises interfacing hardware components of said first digital device and/or system for said generating.

16. The method of claim 12 further comprises interfacing hardware components of said first digital device and/or system for said generating IDs derived from a group consisting of system product ID, universally unique identifier, Internet IP address, domain name address, URL (uniform resource locator) address, MAC (media access control) addresses of communication circuitry, Mobile Equipment ID, phone number ID, Basic Input/Output System firmware ID, motherboard ID, microprocessor ID, graphics processing unit ID, RAM (random access memory) module ID, memory storage ID, TPM (trusted platform module) module ID including generated ID, monitor ID, device OS license ID, activation ID, installation ID, digital license ID, machine ID, per-machine-based software program serial key, digital key ID, biometric data ID, VPN (virtual private network) ID, virtual phone number ID, any portion of any of said IDs, any of their conversions, and any of their combinations; and wherein said conversions are derived from a group consisting of encoding, enciphering, hashing, and any of their combinations.

17. The method of claim 12, wherein said generating is adapted to comprise (i) interfacing said first digital device and/or system for retrieving respective IDs of hardware components; and (ii) setting which of said respective IDs to be selected as said device IDs for use as said device fingerprint.

18. The method of claim 12 further comprises (i) in a preliminary communication, transmitting a device biometrics representing said second digital device and/or system to said first digital device and/or system; and (ii) at said first digital device and/or system, utilizing said device biometrics for encrypting data to be transmitted to said second digital device and/or system; so as to impart cryptography protection to both of said first digital device and/or system and said second digital device and/or system.

* * * * *